US012581034B2

(12) United States Patent \
Lawrence et al.

(10) Patent No.: US 12,581,034 B2 \
(45) Date of Patent: Mar. 17, 2026

(54) CONVERTIBLE COMPUTING DEVICE WITH CONFERENCE FORM FACTOR

(71) Applicant: Intel Corporation, Santa Clara, CA (US)

(72) Inventors: Sean J. W. Lawrence, Bangalore (IN); Deepti Patil, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 18/397,266

(22) Filed: Dec. 27, 2023

(65) Prior Publication Data

US 2025/0217092 A1     Jul. 3, 2025

(51) Int. Cl.
| | |
|---|---|
| *H04N 7/15* | (2006.01) |
| *G06F 3/14* | (2006.01) |
| *H04N 23/667* | (2023.01) |
| *H04N 23/90* | (2023.01) |

(52) U.S. Cl.
CPC ............. *H04N 7/15* (2013.01); *G06F 3/1446* (2013.01); *H04N 23/667* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 8,005,518 B1 | 8/2011 | Birsel et al. | |
| 9,727,134 B2 | 8/2017 | Aurongzeb et al. | |
| 9,927,839 B2 * | 3/2018 | Kummer ............... | G06F 1/1641 |
| 9,986,206 B2 | 5/2018 | Fish et al. | |

(Continued)

FOREIGN PATENT DOCUMENTS

| | | |
|---|---|---|
| CN | 102150096 | 4/2014 |
| EP | 4181494 | 5/2023 |

OTHER PUBLICATIONS

Colli, Mitchel, "Dynamic Real Time Videostream Stitching Using Multiple Uncalibrated Cameras", [Online]. Retrieved from the Internet: https: theses.liacs.nl pdf 2018-2019-ColliM. pdf, (Jul. 1, 2019), 45 pgs.

(Continued)

*Primary Examiner* — Quoc D Tran

(74) *Attorney, Agent, or Firm* — Schwegman Lundberg & Woessner, P.A.

(57)     ABSTRACT

Systems and methods for an adaptable computing device, including a device configuration that is convertible between a flat, personal computing orientation and a polyhedron multi-user orientation, and related software for control of audio and video features. An example configuration includes: a segmented display screen to output a display from a plurality of segments repositionable between a first orientation and a second orientation for multiple users; a microphone array and camera array located among the plurality of segments; and processing circuitry to detect a usage mode based on an orientation of the segmented display screen, and modify the audio capture and the video capture based on the usage mode. For instance, the multi-user orientation separates the plurality of segments into respective display areas on outward-facing sides of the segmented display screen, when the adaptable computing device is in a polyhedron shape in the multi-user orientation.

20 Claims, 19 Drawing Sheets

Personal Flat Device

Enterprise Conference Device (Square)

(56)  References Cited

U.S. PATENT DOCUMENTS

| | | | |
|---|---|---|---|
| 10,078,486 B2 | 9/2018 | Lee et al. | |
| 11,510,001 B2 | 11/2022 | Han et al. | |
| D1,020,680 S * | 4/2024 | Lu ................................. | D16/202 |
| 2010/0118112 A1 | 5/2010 | Nimri et al. | |
| 2010/0321275 A1* | 12/2010 | Hinckley .............. | G06F 1/1618 |
| | | | 345/1.3 |
| 2012/0081504 A1* | 4/2012 | Ng .......................... | H04N 7/142 |
| | | | 348/E7.083 |
| 2018/0210514 A1* | 7/2018 | Wang .................... | G06F 1/1669 |
| 2025/0123858 A1* | 4/2025 | Agrawal ............. | G06F 3/04886 |

OTHER PUBLICATIONS

Corey, Ryan M., "Motion Tolerant Beamforming with Deformable Microphone Arrays", 2019 IEEE Workshop on Applications of Signal Processing to Audio and Acoustics, (Oct. 20, 2019), 5 pgs.
Son, Phan Le, "Irregular Microphone Array Design for Broadband Beamforming with Sparse Arrays", Signal Process vol. 193, (Apr. 2022), 20 pgs.

* cited by examiner

Render Mode:
- All Four Screen Segments Display Video Conference Related Data

Render Mode:

Screen Segments are Turned ON/OFF Based on Participant Movement in the Conference Room Video Conference Data Shown on These Screen Segments after Participant Changes Seating Position These Screen Segments are Turned OFF

Interactive Mode:

When a Participant Moves the Device, Interactive Mode is Enabled to Allow the Participant to Use the Device User can Access the Device Using this Screen Segment The other Three Screen Segments Continue to Render Video Conference Related Data

Whiteboard Mode:

When a Whiteboard is Present in the Conference Room, the System Captures and Streams Whiteboard Content Camera Detects and Captures Whiteboard

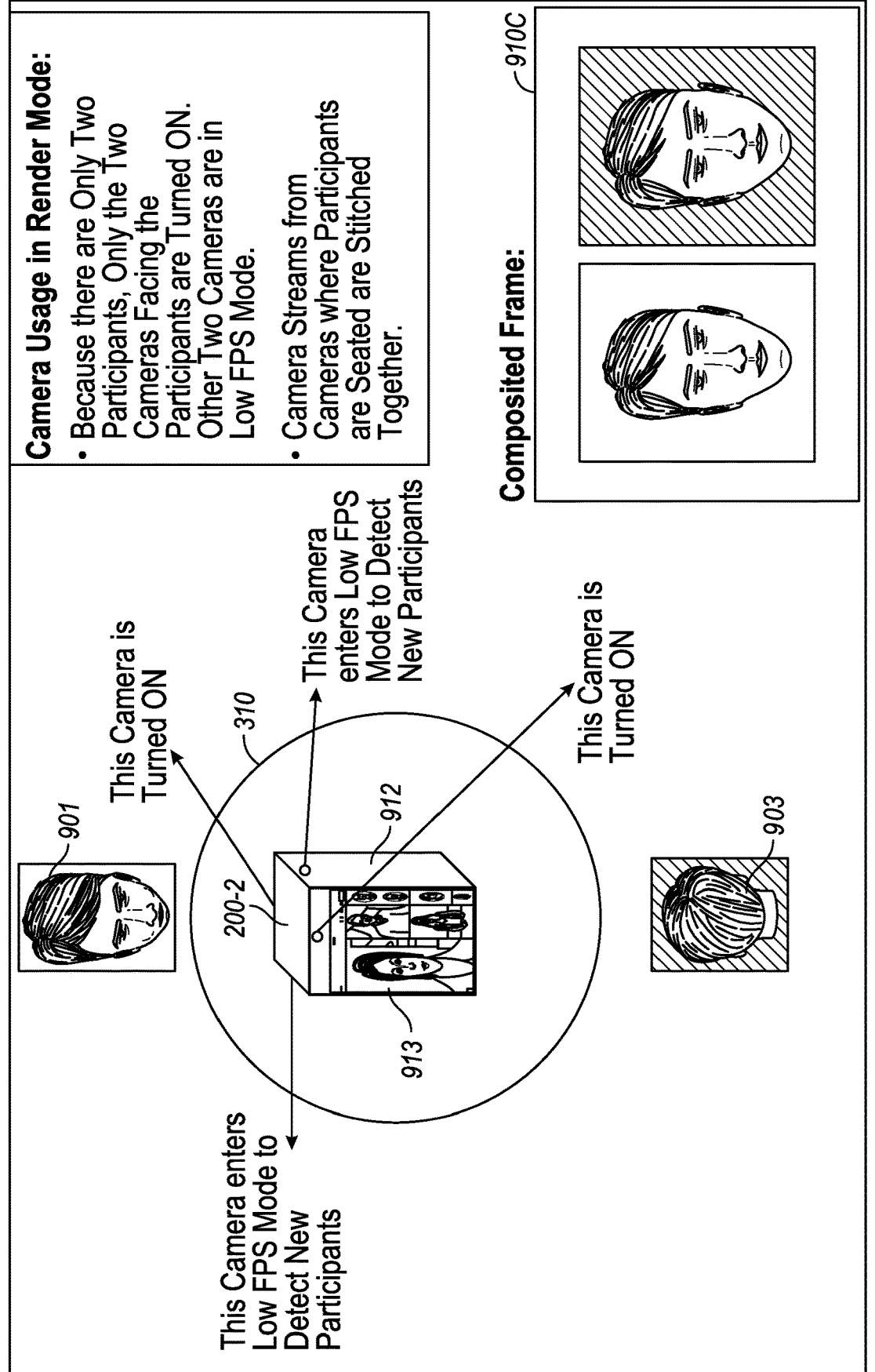

Camera Usage in Render Mode:

- Because there are Only Two Participants, Only the Two Cameras Facing the Participants are Turned ON. Other Two Cameras are in Low FPS Mode.

- Camera Streams from Cameras where Participants are Seated are Stitched Together.

Composited Frame:

910C

This Camera is Turned ON

901

This Camera enters Low FPS Mode to Detect New Participants

310

200-2

912

913

This Camera enters Low FPS Mode to Detect New Participants

This Camera is Turned ON

Camera Usage in Render Mode:

- All Four Cameras are Turned ON To Capture the Participants Seated on each Side

- Camera Streams from all Four Cameras are Stitched Together

- Participant who is Speaking is Highlighted in the Composited Video Frame

Composited Frame:

1000

1010   Obtain Usage Data
(e.g., Orientation, Video Inputs, Audio Inputs)

1020   Determine Device Usage Mode Based On Usage Data

1030   Adapt Device And Software Functionality Based On
Determined Usage Mode

1040   Perform Content Rendering, Content Interaction, And/Or
Video Compositing, Based On Determined Usage Mode

1

CONVERTIBLE COMPUTING DEVICE WITH CONFERENCE FORM FACTOR

BACKGROUND

Various types of devices have been developed to assist with conference calls and specifically the capture of video and audio from multiple users in a conference room. Some of these devices use circular or linear array microphones and up to 360-degree cameras to capture the video of multiple participants during calls and meetings. However, these devices are often dedicated to a single use in a conference room, and these devices may not be easy to use or capable of presenting audio and video for all users during an ongoing meeting or call.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 9A to 9E illustrate video rendering scenarios provided in connection with respective uses of a convertible computing device, according to an example;

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

The following disclosure relates to aspects of a computing device that can be converted between a flat, personal computing (e.g., tablet) device form factor and a multi-sided, conferencing device form factor. The following disclosure also discusses various usage modes of this convertible conference device, which includes software functionality to perform adaptable types of content rendering, content interaction, or video compositing. These usage modes may enable advanced features to be provided for interactive communication sessions and related software applications, including but not limited to client-based video conferencing software used to participate in meetings, conference calls, webinars, presentations, etc.

One of the problems with existing conferencing input devices, including those having multiple cameras, is that such input devices are often dedicated devices that are not moveable and have a high cost of hardware. Additionally, existing conferencing input devices are typically not linked to or associated with any particular user, and will often include reduced features so that the device can be used by any participant. In contrast, the configurations discussed herein enable a user's data to be easily presented and shared from a personal computing device during a call or meeting. The configurations discussed herein also provide the ability for multiple users to view content and provide interaction at the same time—while also capturing audio and video of a respective user.

The following introduces aspects of a dual form factor that can interchange between personal and multi-user (e.g., enterprise) uses. The following also introduces new collaborative usage modes enabled from a single device during a meeting or call. In an example, this dual form factor is provided via a flat, continuous screen, e.g., a widescreen similar to the display included in a tablet or notebook, which is convertible into a multi-sided conference device. Additionally, the following introduces additional features and capabilities of this convertible device based on enhanced microphone configurations and beamforming considerations; multiple screen and display configurations; individualized camera configurations, compositing, and video handling; and multiple collaborative modes of operation.

Figure 1:
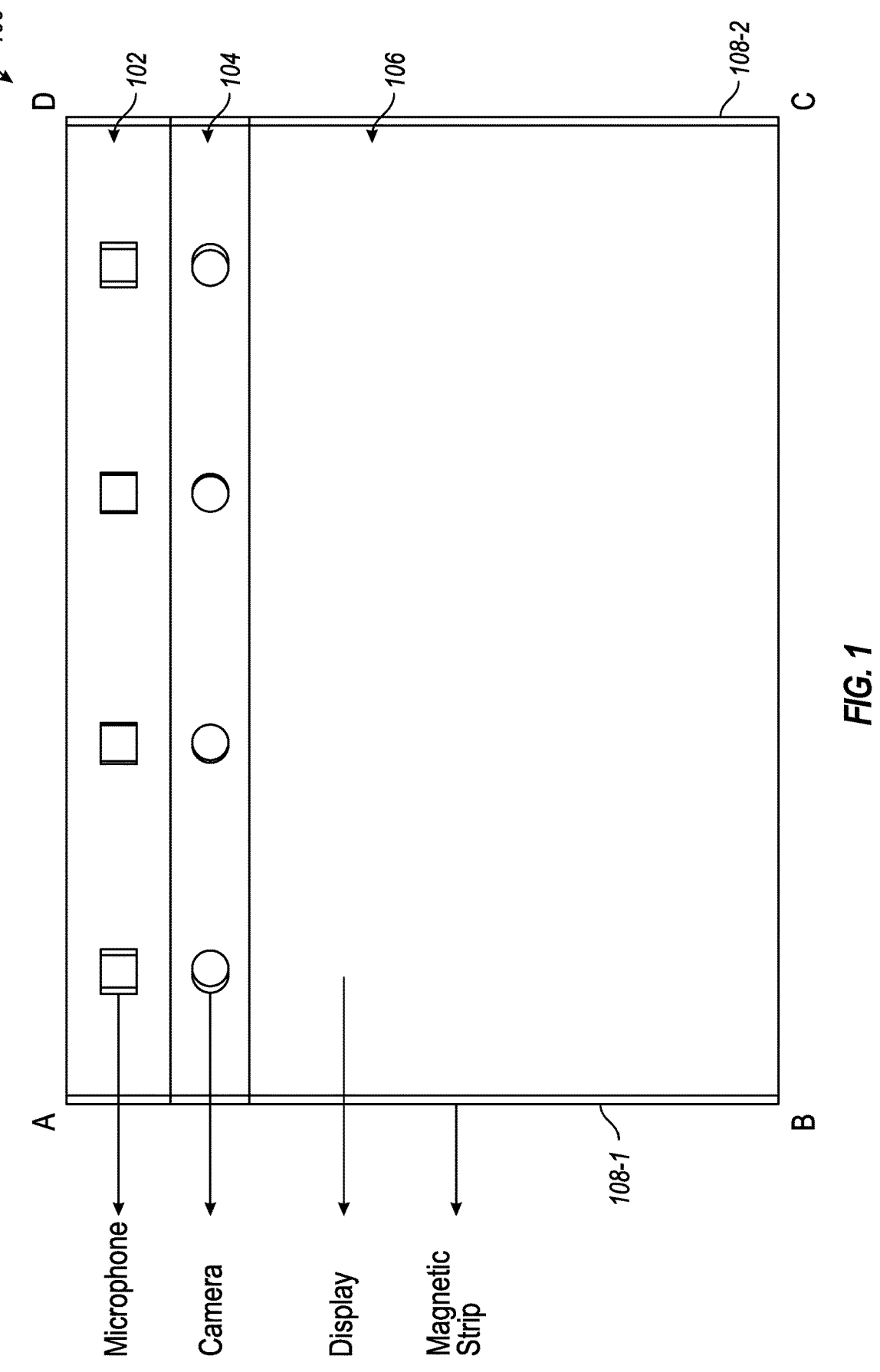
FIG. 1 illustrates a shape of a convertible computing device having a flat form factor, according to an example.

FIG. 1 illustrates a shape of an example convertible computing device 100 having a flat form factor. The general orientation of the convertible computing device 100 is as a planar foldable or rollable device that can be converted into a multi-sided conferencing device. As shown, this view of the convertible computing device 100 has vertical areas for hosting respective microphones 102, respective cameras 104, and a foldable or rollable, flat screen display 106 combined from multiple screens or sections of a single screen. The thickness of a housing for the convertible computing device 100 is not illustrated from the front view of FIG. 1, but it is understood that the housing may enclose a variety of internal electronic components (e.g., a battery, processing circuitry, memory, screens, sensors, etc.).

Figure 2A:
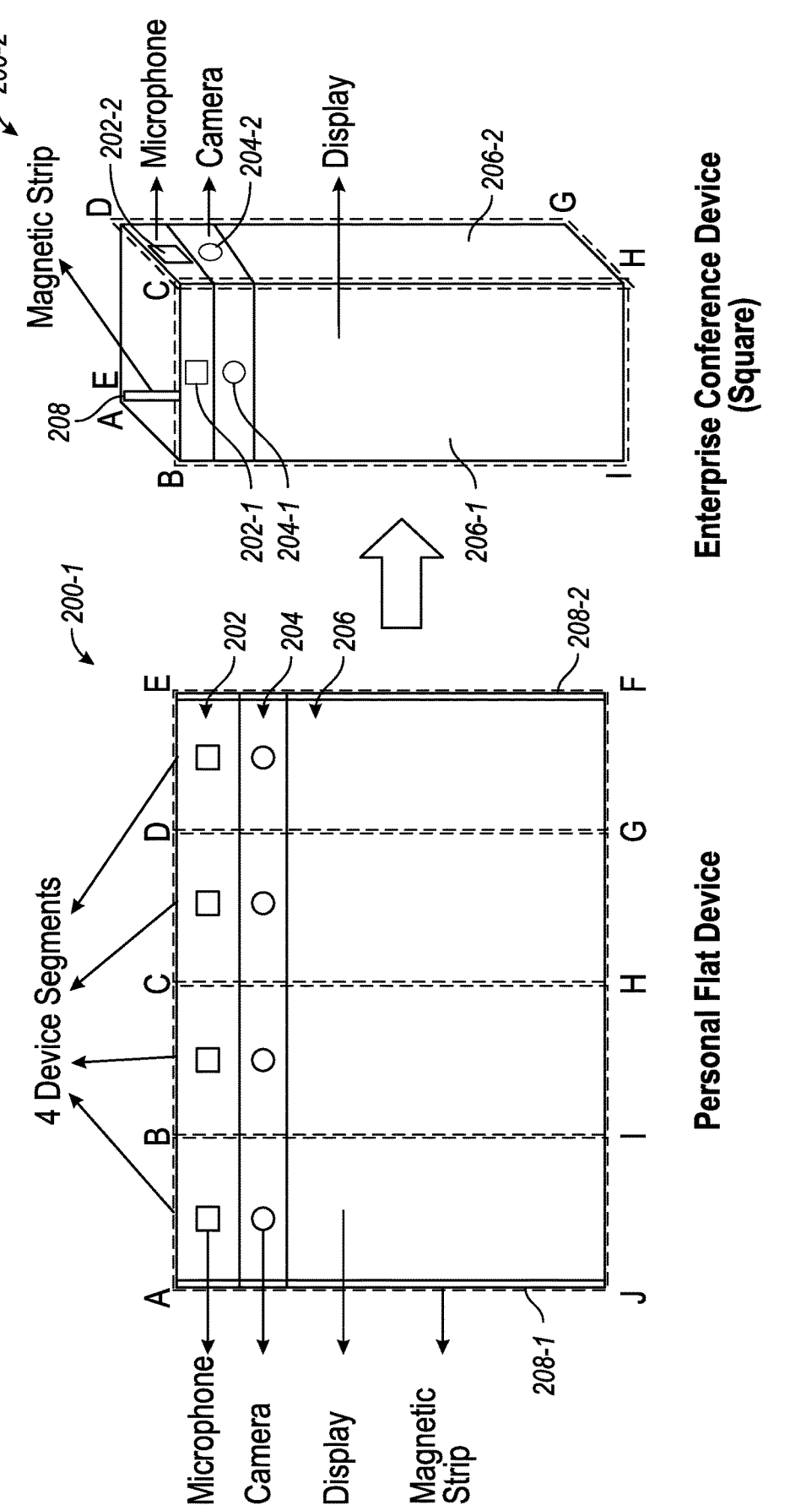
FIGS. 2A and 2B illustrate configurations of a convertible computing device having a flat form factor convertible into a conference form factor, according to various examples.
Figure 2B:
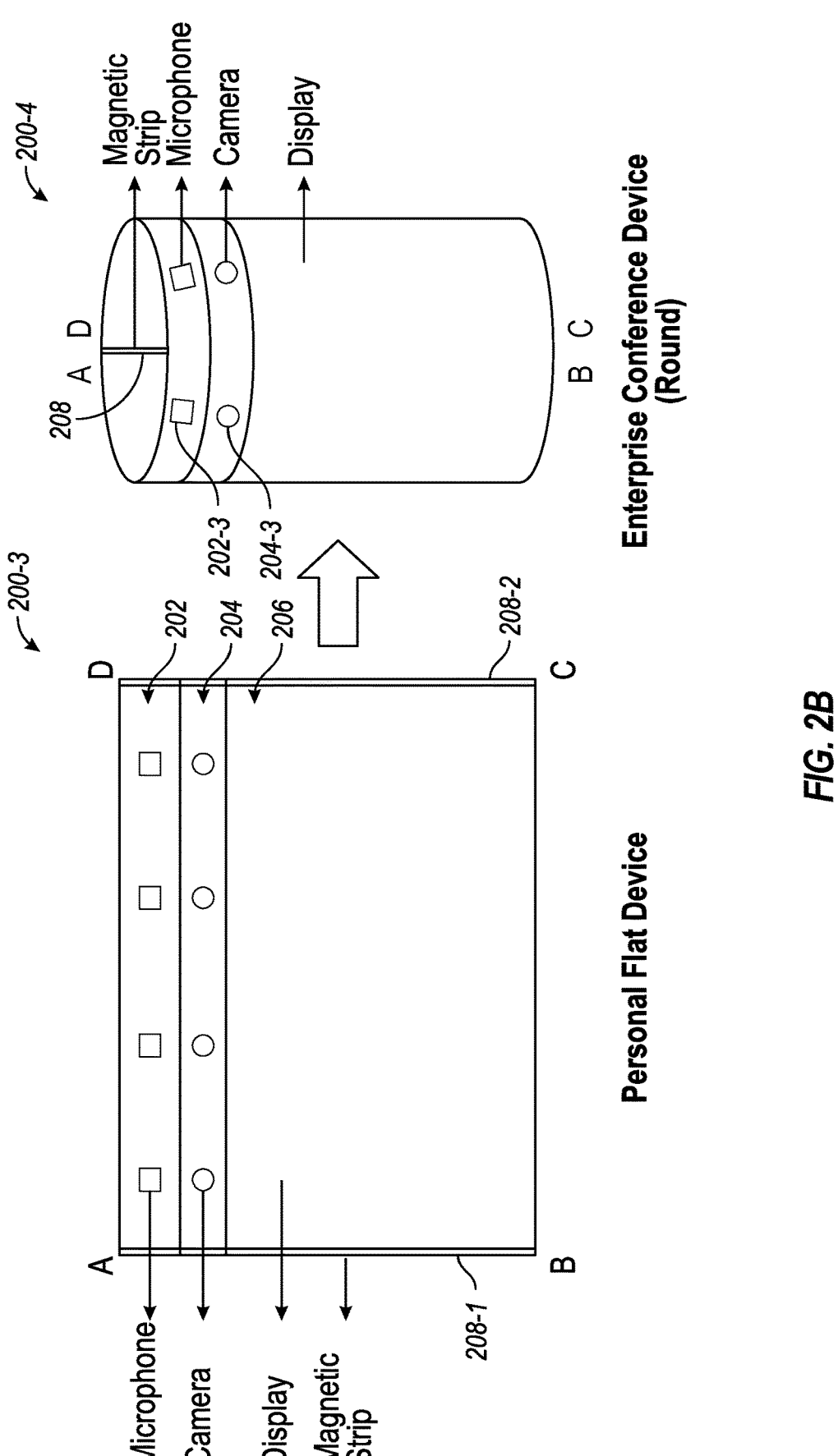
Figure 7:
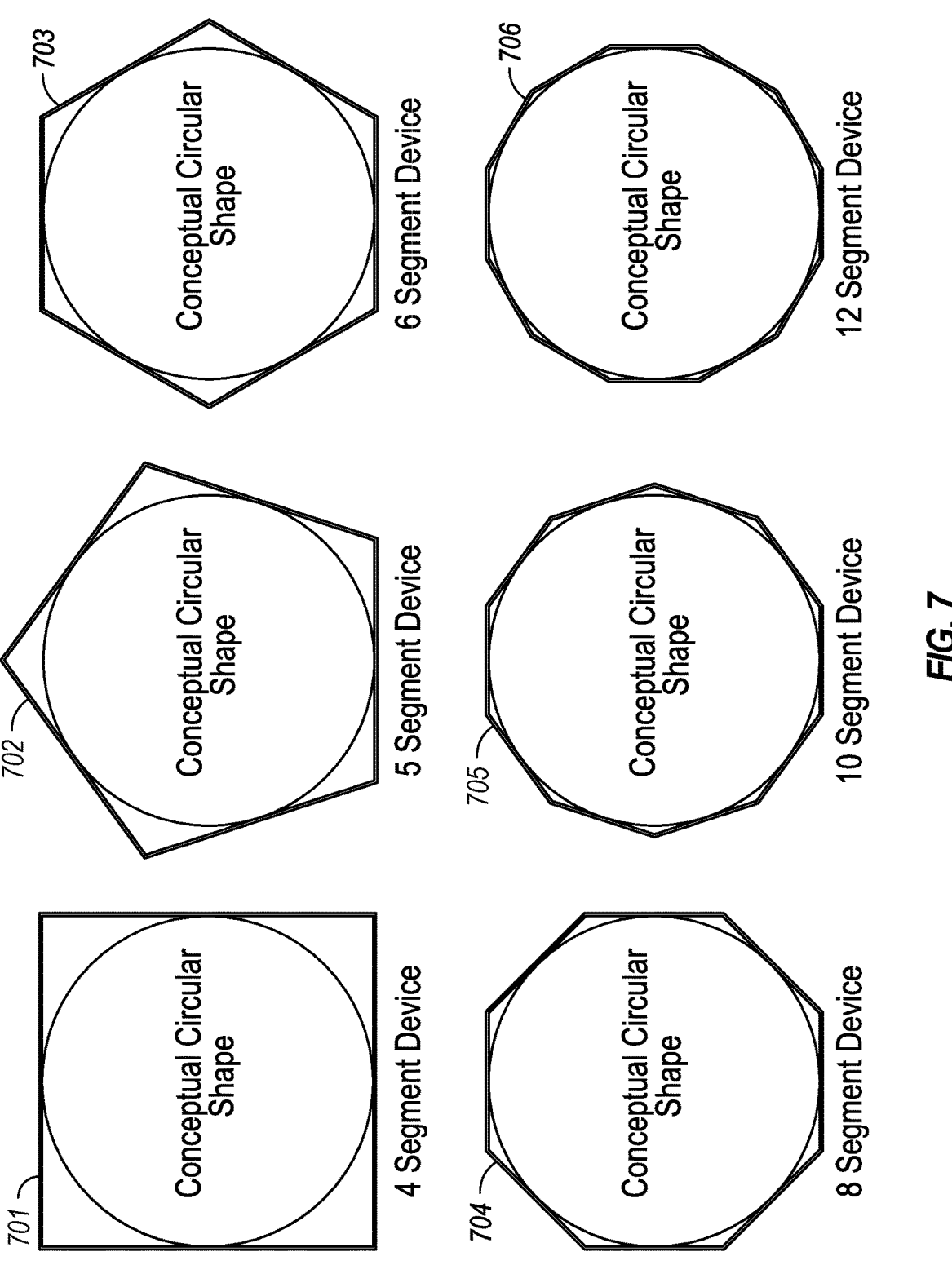
FIG. 7 illustrates potential shapes provided by various configurations of a convertible computing device, according to an example.
Figures 8A, 8B, 8C, 8D, 8E:
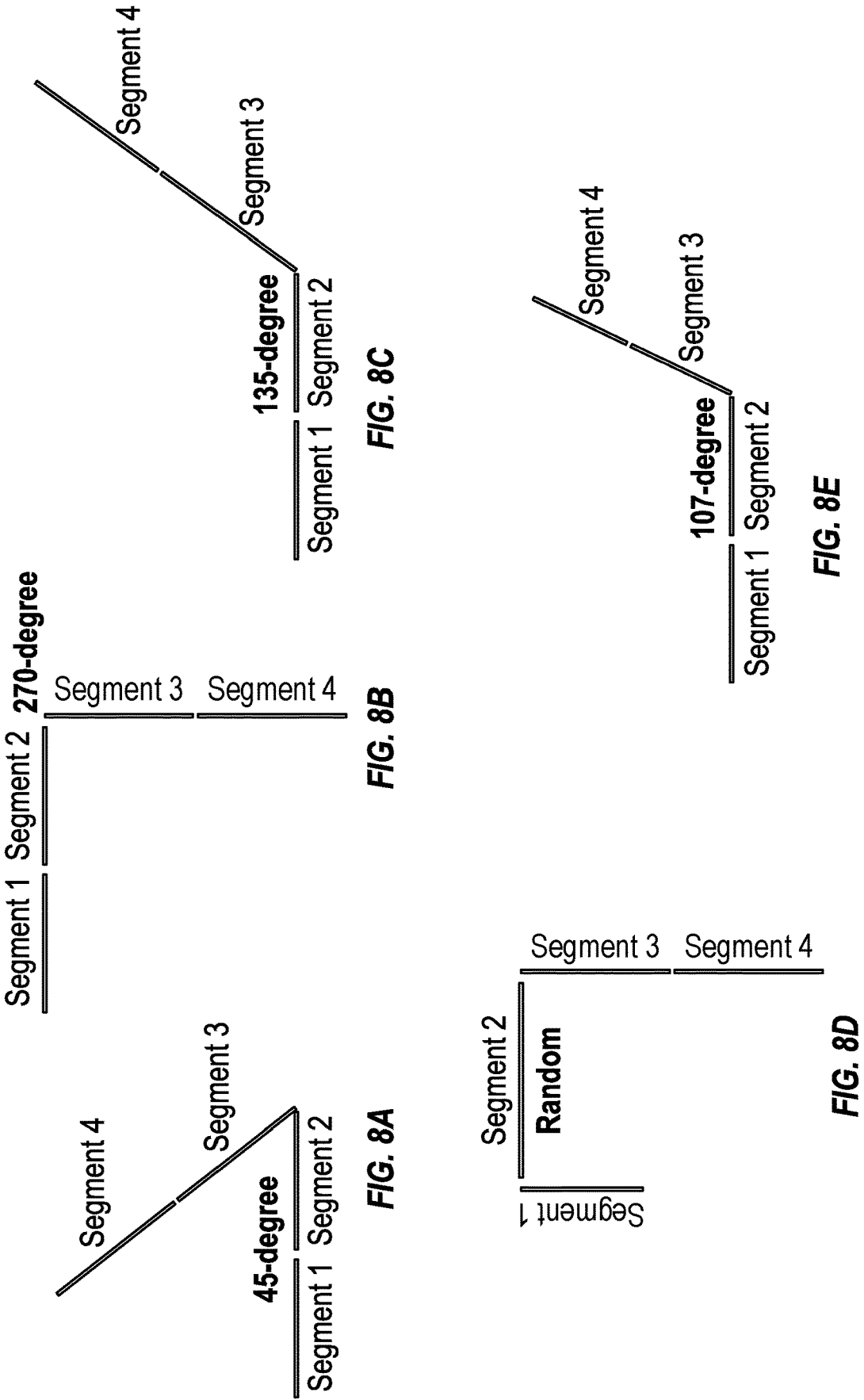
FIGS. 8A to 8E illustrate additional shape outlines provided by various configurations of a convertible computing device, according to an example.

The convertible computing device 100 is operable as a "2-in-1" device that can be dynamically deployed as a personal computer or as a conference device, based on a user's need. The foldable, flat screen display 106 includes multiple segments with hinges or separation mechanisms (not shown) that connect each segment. The use of separation mechanisms for each segment is shown in more detail in FIGS. 2A and 2B below. In an example, the foldable, flat screen display 106 can be converted into cuboid and polyhedron shapes as illustrated in FIG. 2A, adapted into multi-segment shapes as illustrated in FIG. 7, or adapted into multiple linear segments as illustrated in FIGS. 8A to 8E. In other examples, the foldable, flat screen display 106 can be converted into a rounded or a near-rounded shape as illustrated in FIG. 2B.

The convertible computing device 100 includes "X" segments (vertically oriented in FIG. 1) with "Y" microphones 102 and "Z" cameras 104. While convenient to visualize, X, Y, and Z do not have to be equal. When they are equal, then a microphone and camera pair are present per segment, but other configurations may provide a different distribution of microphones and cameras. The multiple microphones 102 and cameras 104 are arranged in such a way that when the device 100 is folded into a cuboid or polyhedron shape (referred to herein as a "multi-user orientation"), the device 100 is adapted into an enterprise conference device mode that covers 360-degree audio and captures a 360-degree camera field of view. Although not depicted, the convertible computing device 100 may also include one or multiple speakers for the output of audio.

In an example, the segments of the convertible computing device 100 can be folded from a rectangular plane (a "personal computing orientation") into a cuboid/polyhedron shape (the "multi-user orientation") as determined by the segment/hinge configuration of the device. Once the convertible computing device 100 is folded into a cuboid/polyhedron shape, the microphones 102 arranged linearly on the convertible computing device 100 are operated to form a circular microphone array. The cameras 104 are also operated to form an array that covers an entire 360-degree FOV (field of view) when placed into the closed polyhedron shape.

Magnetic strips 108 or another engageable/disengageable mechanism on two opposite sides of the convertible computing device 100 (e.g., magnetic strip 108-1 on a first side, and magnetic strip 108-2 on a second, opposite side) secure the device into a cuboid/polyhedron shape when folded. The convertible computing device 100 also includes sensors and data processing to determine a hinge/segment position and the orientation of the device (e.g., an upright, vertical multi-user/conferencing orientation to capture and present content in a call). The detected orientation may be used to control relevant device configurations that enable dynamic interaction and conferencing usage scenarios, as noted below.

FIGS. 2A and 2B illustrate configurations of a convertible computing device adapted into a multi-user orientation. These configurations demonstrate how a single device can be switched interchangeably between a personal flat form factor and an enterprise conferencing form factor. Specifically, FIG. 2A depicts the adaptation of the foldable display to convert a flat plane (rectangular) shaped device in a personal computing orientation into a cuboid/polyhedron-shaped device in a multi-user orientation, whereas FIG. 2B depicts the adaptation of the foldable display in the personal computing orientation into a circular or nearly circular-shaped device for the multi-user orientation.

FIG. 2A depicts a first conversion design arrangement, demonstrating how a personal flat shaped device 200-1 can be folded into a cuboid-shaped device 200-2 to transform into a conference audiovisual device. Each of the segments includes one or more of the microphones 202, cameras 204, and display screens 206. For instance, the microphone 202-1, camera 204-1, and display screen 206-1 are located on a first outward-facing side of the cuboid-shaped device 200-2, whereas the microphone 202-2, camera 204-2, and display screen 206-2 are located on a second outward-facing side of the cuboid-shaped device 200-2.

The arrangement also includes three hinges at the edges of each segment "B-I", "C-H", and "D-G", and a magnetic strip 208-1, 208-2 at two edges "A-J" and "E-F". The hinges and the magnetic strips together hold the conference device in a proper cuboid shape, via a magnetic attachment 208. Other locking mechanisms may be used in addition to or in place of a magnetic strip.

In many of the following examples, a polyhedron shape is provided with the use of hinges located between rigid segments (hingeably connected segments). However, if a sufficient number of hinges and rigid segments are used, a circular or near-circular shape can be achieved. Further, although many of the examples below refer to polyhedron shapes, the examples may also be applicable to use cases of a device adapted into a circular or non-polygonal shape (such as cones or spheres).

FIG. 2B depicts a second conversion design arrangement, demonstrating how a personal flat-shaped device 200-3 could be conformed into a cylindrical-shaped device 200-4 to form a conference audiovisual device. The microphones 202, cameras 204, and display screens 206 from each segment are arranged around the circumference of the cylindrical-shaped device 200-4 (e.g., to provide microphone 202-3 and camera 204-3 to capture audio and video at a particular angle of the cylindrical-shaped device 200-4). Similar to the example of FIG. 2A, the flat-shaped device 200-3 includes magnetic strip 208-1 and magnetic strip 208-2 that are coupled with a magnetic attachment 208 to form the multi-user orientation of the conference device.

There may be limitations in achieving a completely circular device. As will be understood, the use of a complete cylindrical shape (without hinges) may not be possible in some scenarios due to the requirement of rigid parts like memory, circuitry units, and batteries. However, adaptation into a near-circular shape may be provided based on the example arrangements discussed with reference to FIG. 7, below.

Various modes of operation for video conferencing and calls may be enabled based on the shapes and form factors discussed herein. In the case of a cuboid-shaped conference device, there are four display screen segments on each vertical (upright) side of the cube where content can be displayed. The video conferencing-related content can be displayed on any of the screen segments. The content displayed on a respective segment could include faces of the video call participants, whiteboard data, screen share data, a chat window, etc.

The following introduces three display modes for the convertible computing device: Render mode, Interactive mode, and Whiteboard/Object mode. However, other modes may also be enabled. Each of these modes provides specific details of the use of a convertible conferencing device, based on the adaptation of several microphones and cameras so that a circular microphone array (360-degree audio) and camera array (360-degree video) can be captured. These modes may also enable screen segments to display variations of video conferencing or software application output for respective users. In addition to these modes, the convertible computing device may implement intelligent changes for automatic or recommended configurations based on detecting device usage or changes among fixed and adaptable device positions.

Figure 3A:
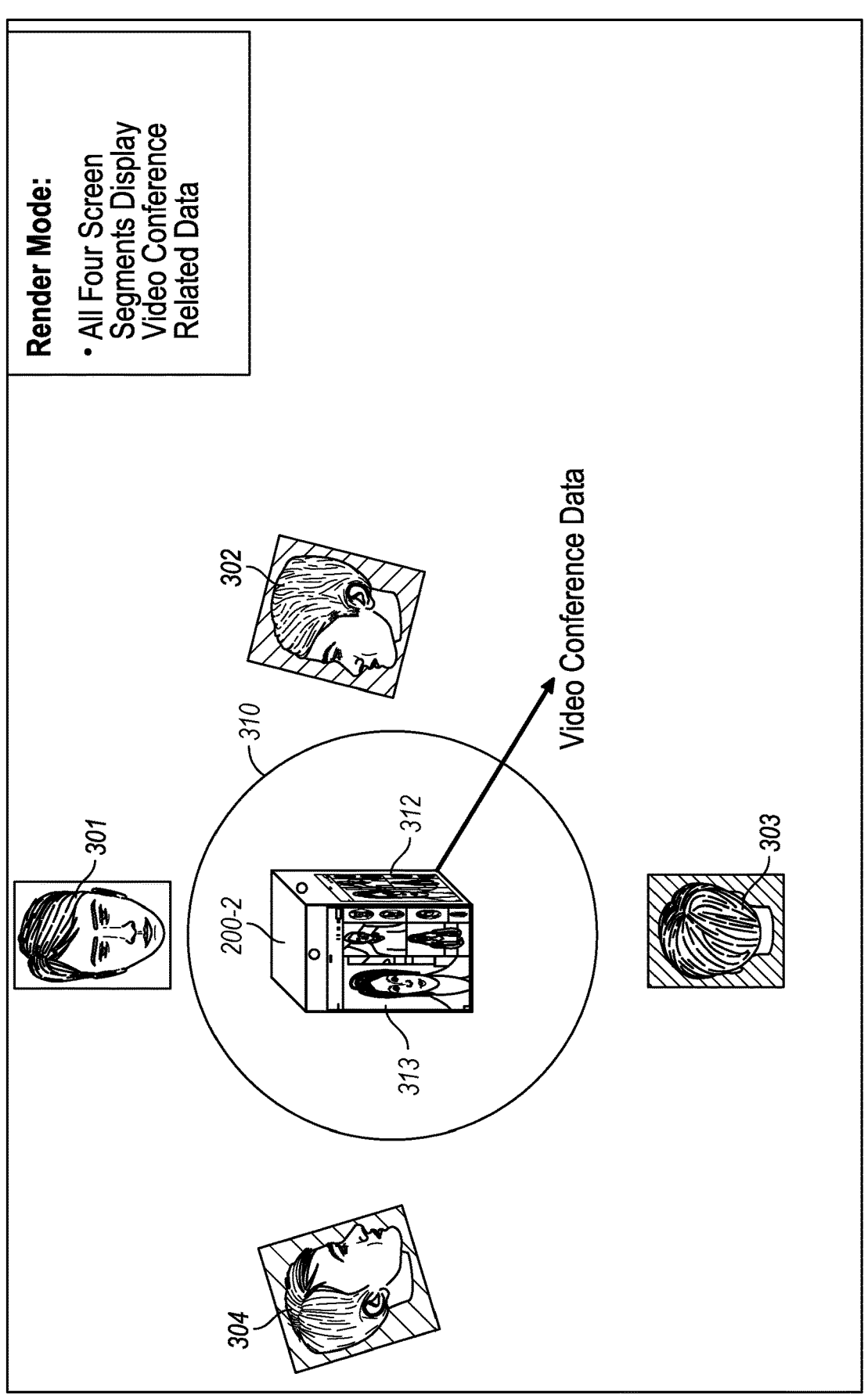
FIGS. 3A, 3B, and 3C illustrate scenarios of the use of a convertible computing device, according to an example.
Figure 3B:
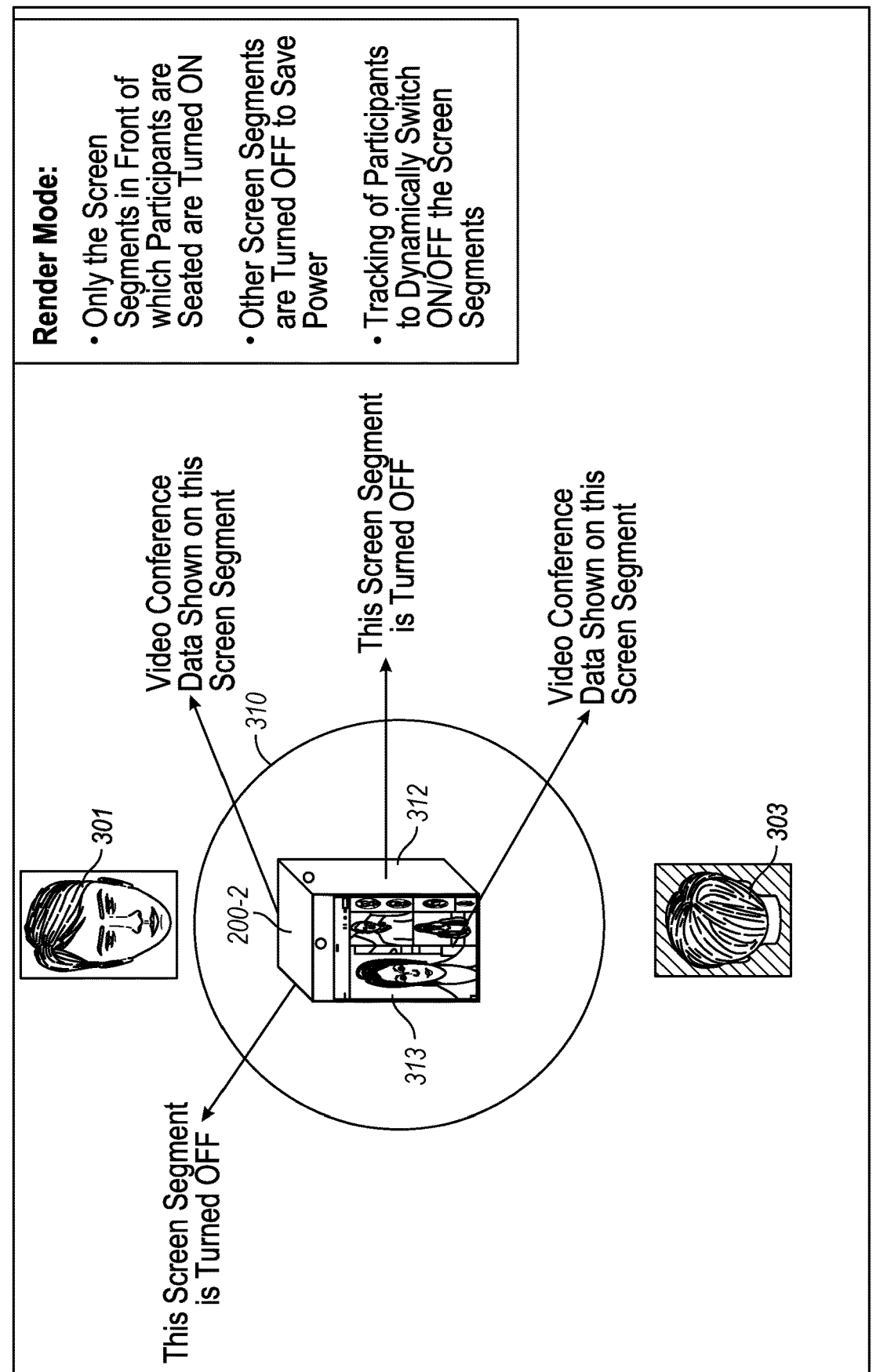
Figure 3C:
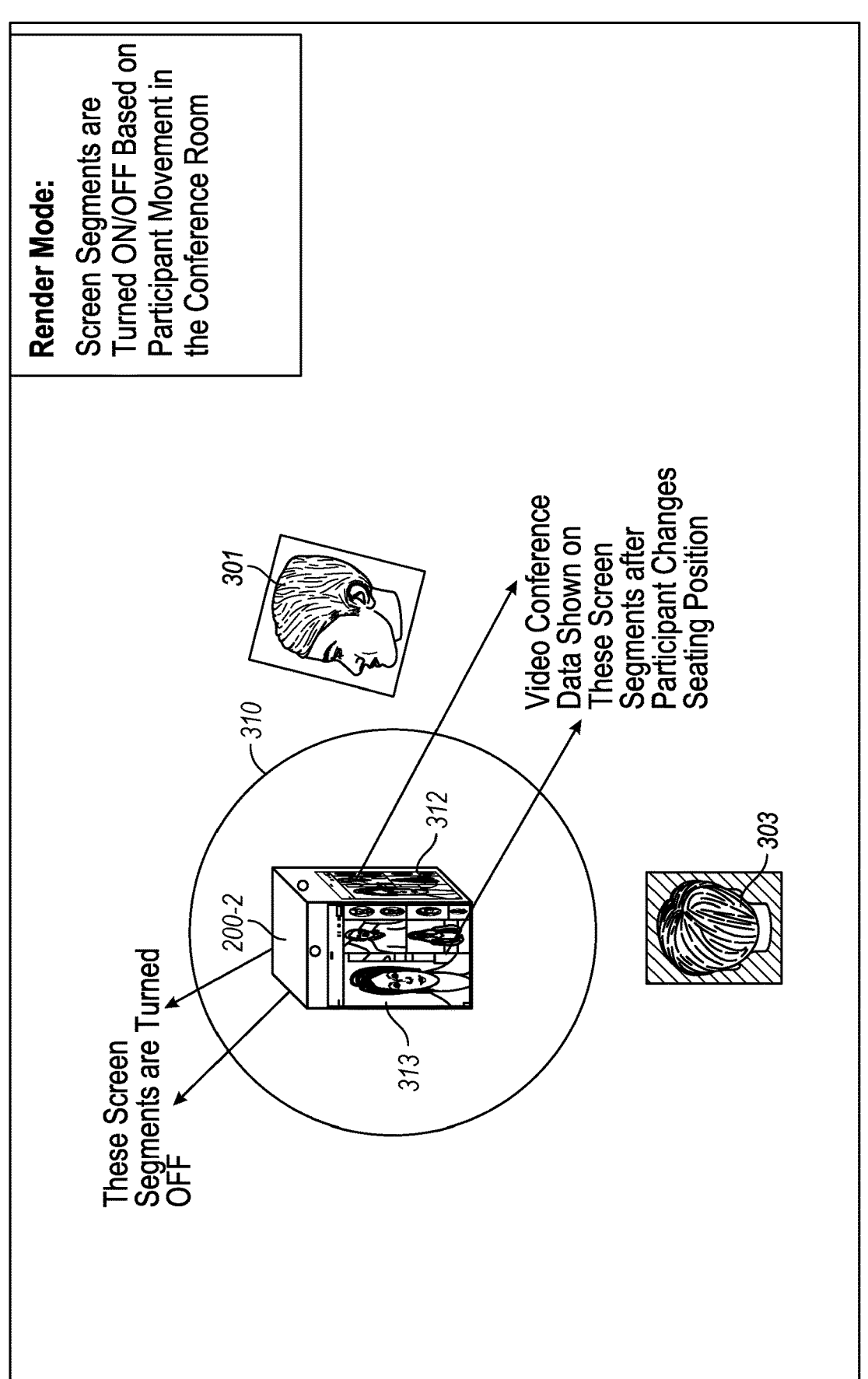

FIGS. 3A, 3B, and 3C illustrate scenarios of the use of the convertible computing device, with aspects of a render mode used for a conference call scenario. FIG. 3A depicts a render mode with four participants. FIG. 3B depicts a render mode with two participants sitting opposite to each other. FIG. 3C depicts a render mode with two participants sitting next to each other after one of the participants has changed positions. Each of these settings depicts how the convertible computing device can dynamically present content to multiple users when the device is in a multi-user orientation.

FIG. 3A shows how the cuboid-shaped device 200-2 can be placed at a center of a table 310 to present content and capture audiovisual data from each user 301, 302, 303, 304. In this render mode, all four screen segments display video conference-related data to the respective users. However, the display of each segment may be customized to a particular user. For instance, display screen segment 313 presents a video call view to user 303, while display screen segment 312 presents a similar (but different) video call view to user 302 (e.g., presenting a different arrangement of users in the video call, based on who is speaking).

The render mode may be activated automatically when the convertible computing device is located at the center of a table (e.g., a circular table) and positioned away from all participants. In this setting, the convertible computing device can use all of the four screen segments for rendering video conferencing-related data, such as video data, screen sharing data, chat content, and the like. The convertible computing device can identify where each participant is seated relative to the device, and render content only on those screen segments where participants are seated. The convertible computing device can dynamically turn ON/OFF different screen segments based on a detected user presence or sensor data.

FIG. 3B shows a further example of the cuboid-shaped device 200-2 placed at the center of the table 310. In this scenario, only two users (user 301 and user 303) are the only users present at the table 310, as the users are seated in front of two screen segments of the convertible computing device (two out of four screen segments). The convertible computing device may identify and render content on only those two screen segments, whereas the other two screen segments may be turned off. This helps save power and processing resources of the convertible computing device.

FIG. 3C shows a further example of the cuboid-shaped device 200-2 placed at the center of the table 310 and bordered by two users. In this scenario, one of the users (user 301) moves around the conference table. The convertible computing device tracks the user's movement, and turn on or turn off the relevant screen segments in response to the user's movement (e.g., to turn on the display screen segment 312 when the user 301 moves to the corresponding side of the table).

Figure 4:
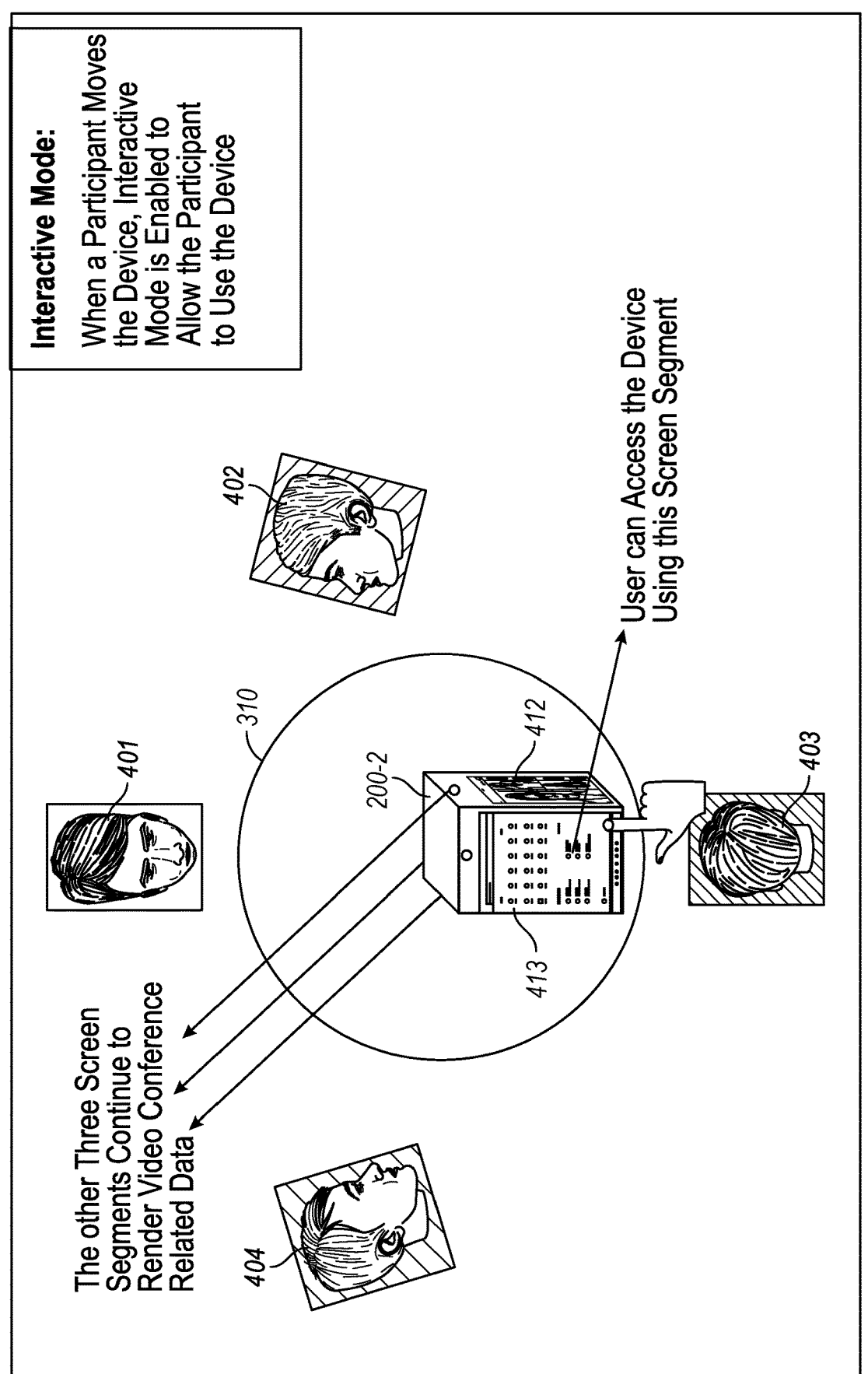
FIG. 4 illustrates an interactive scenario of the use of a convertible computing device, according to an example.

FIG. 4 illustrates an interactive scenario of the use of a convertible computing device, with aspects of an interactive mode. In this setting, the cuboid-shaped device 200-2 is located at the center of the table 310, and is surrounded by three users (user 401, user 403, user 404). Similar to the examples of FIGS. 3A to 3C, the content rendered on relevant screen segments is specific to the particular user, such as a presentation of video call content on display screen segment 412 specific to user 402.

The interactive mode may occur in a scenario where the convertible computing device is placed closer to one of the users, to enable a user to touch the display screen segment and provide interactive control. In this scenario, the convertible computing device enables the corresponding screen segment (one out of the four available) to be interactive. For instance, this display screen segment 413 may enable touch-screen operation for the user 403, for purposes such as adding notes, using the device to search for content, or to present supplemental text or video content during the call.

The other three screen segments can continue to be used for video rendering during a video call. Once the user 403 moves the device away from their position (e.g., out of reach back to the center of the table), the convertible computing device starts rendering video conference-related data on that display screen segment 413.

In a further scenario of the interactive mode, suppose that another user (e.g., user 402) moves the convertible computing device closer to this particular user, and interacts with the device by touching the screen to also add new notes or to access content on the screen segment (e.g., display screen segment 412). The convertible computing device enables interactive features in the display screen segment 412 while the interactive features remain enabled in the display screen segment 413. These features in the particular interactive mode may be detected and activated (or deactivated) as a result of sensor data, an input or output change, user input, or some combination.

Figure 5:
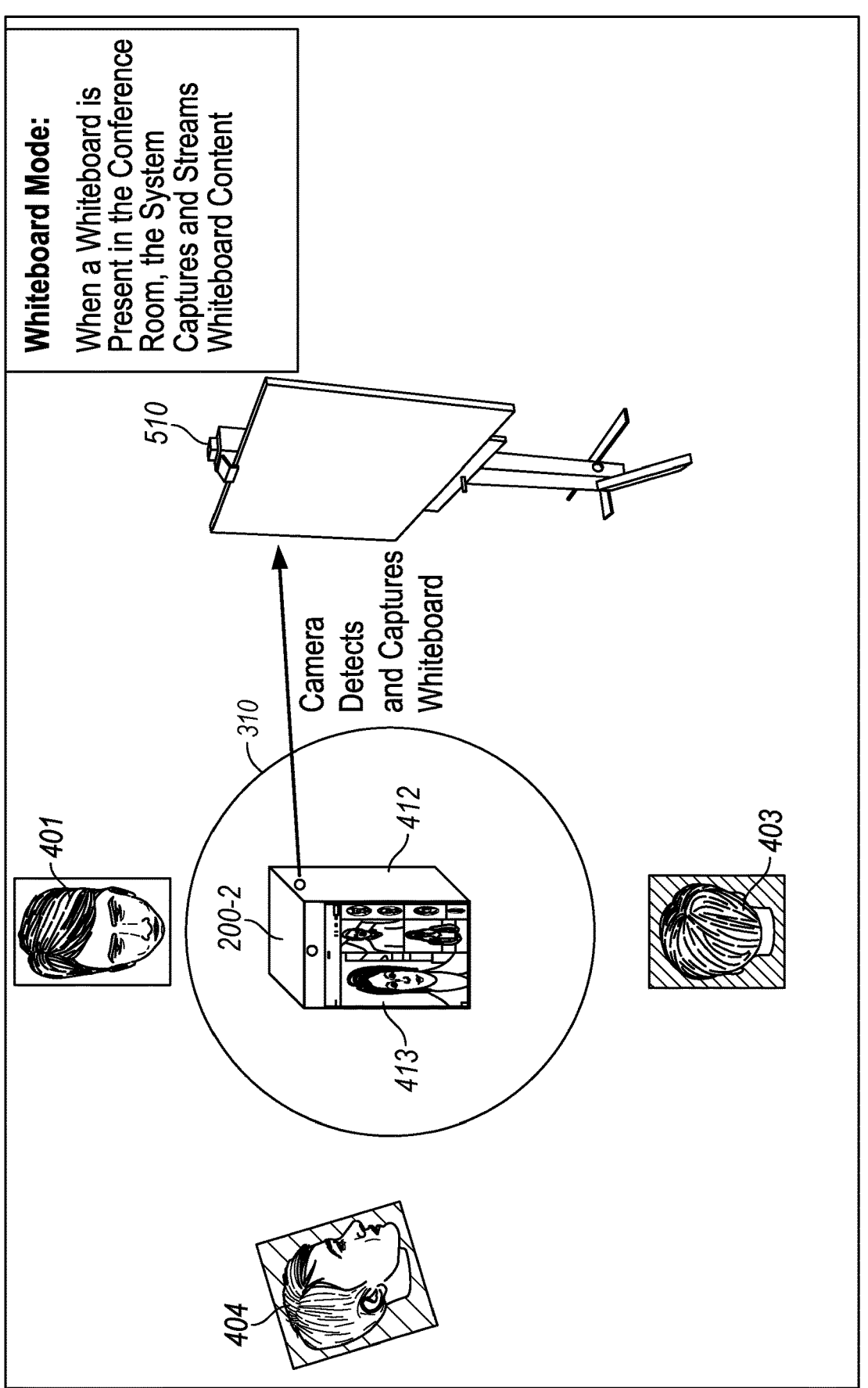
FIG. 5 illustrates a whiteboard scenario of the use of a convertible computing device, according to an example.

FIG. 5 illustrates a whiteboard scenario of the use of a convertible computing device, with aspects of a whiteboard or real-world object presentation mode (also referred to as a "object presentation mode"). In this setting, the cuboid-shaped device 200-2 is located at the center of the table 310, and is surrounded by three users 401, 403, 404 similar to the scenario of FIG. 4. However, in this mode, the convertible computing device enables capture and streaming of a whiteboard 510 in addition to video capture and display of the respective users. The convertible computing device may automatically detect the presence of the whiteboard 510 or another real-world object (e.g., a poster, external screen, etc.), and automatically capture video from this whiteboard 510 or object to be displayed along with the other video participants.

The respective modes described above may be implemented by functions in the convertible computing device that detect the device configuration and the intended usage. In an example, aspects of configuration/usage detection intelligence may be implemented by specialized hardware and software configurations, including aspects detected by an operating system or a presentation software application.

Figure 6:
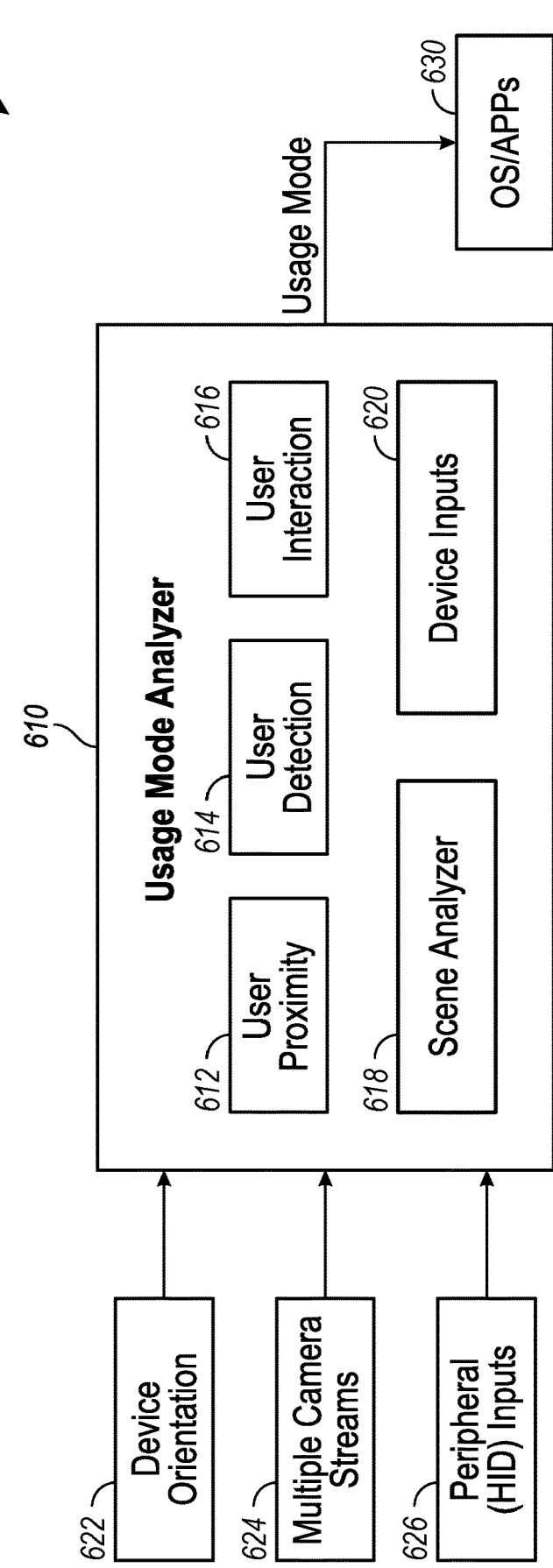
FIG. 6 illustrates data processing operations performed by a convertible computing device, according to an example.

FIG. 6 illustrates data processing operations performed by a convertible computing device, in connection with configuration/usage detection processing functions 600. These functions 600 include a usage mode analyzer 610 adapted to determine a usage mode of the device based on usage-related data, and communicate this usage mode to the operating system and/or one or more software applications 630.

The usage mode analyzer 610 may perform a determination of whether the device is to operate in render, interactive, or object/whiteboard mode. A particular usage mode may be determined by the usage mode analyzer 610 based on one or more of: a device orientation configuration (e.g., provided from device orientation data 622), user presence detection functions 614, user proximity detection functions 612, user interaction detection functions 616, and scene/object detection from a scene analyzer 618. The usage mode analyzer 610 may also consider other device inputs 620, such as those provided to the computing device via the operating system and/or one or more software applications 630.

A device orientation configuration may be detected via hinge angle sensing methods and tracking of the relative orientation of each segment of the device. The device orientation data 622 thus can directly trigger or modify the usage mode, in addition to data inputs provided from multiple camera streams 624, peripheral HID (human input device) inputs 626, audio or microphone data (not shown), among other data sources. As noted, the device orientation can also be displayed visually to the user via a user interface, including in the operating system and/or one or more software applications 630.

The convertible computing device may be transformed into a variety of modes and orientations for video and audio capture, including a 360-degree conferencing mode that allows capture of video and audio from any angle around the device. As noted above, the convertible computing device may primarily transition between flat tablet usage and the enterprise-type polyhedron shape (that covers 360-degree camera views and includes a 360-degree microphone array audio capture). When in 360-degree mode, a linear array of microphones acts as a circular microphone array, matched with a linear array of cameras that also act as a circular camera array. Beamforming coefficients for microphones can be determined during calibration during manufacture to accurately capture audio from different users and among the 360 degrees of coverage. Video processing including compositing may be used to provide 360 degrees of coverage around the device.

Feedback can be provided to the user to indicate when the convertible computing device is in a particular usage mode or orientation associated with a usage mode. The feedback can be provided via an audio message, LED light indicators, vibration actuators, or visually on the screen. Visual feedback on a screen user interface may also indicate intermediate positions (e.g., based on a capability of sensing position from an orientation of the hinges). When in intermediate positions, the device is aware of the microphone array, camera array, and the screen's relative positions. This can be achieved with hinge angle sensing. A variety of hinge angle sensing techniques may be used.

If hinges with sufficient clearance are used to maintain the device shape, the magnetic strip/lock can also be used as a user experience/feedback consideration to indicate to the user that the edges are correctly in position. In the cuboid example, there are three hinges used to enable the device to provide four display screen segments. Increasing the number of hinges X enables an increase in the number of display screen segments to X+1. The number of cameras and microphones can also be increased to X+1 or some greater number. For example, with seven hinges, an octagonal (eight-sided) prism-shaped device may be enabled.

FIG. 7 illustrates potential shapes provided by various configurations of a conferencing device. This depicts a shape 701 provided from a four-segment device, a shape 702 provided from a five-segment device, a shape 703 provided from a six-segment device, a shape 704 provided from an eight-segment device, a shape 705 provided from a ten-segment device, and a shape 706 provided from a twelve segment device. As will be understood, the greater the number of hinges X, the more circular shape that the device can be arranged into (which more closely matches a conceptual circular shape).

FIGS. 8A, 8B, 8C, 8D, and 8E illustrate additional shape outlines provided by various configurations of a convertible computing device. Here, each outline, provided from a top-down view, shows how various segments of a four-segment device may be placed into intermediate fixed positions or intermediate random positions. This may be used to provide additional orientations of a conferencing arrangement, such as when a device is placed upright on a conference room table with users asymmetrically distributed around the table.

Some fixed orientations of the segments (such as 45-degree positions) may cause the convertible computing device to activate and use (or de-activate) different microphone and camera configurations. In order for the device to make use of multi-microphone and camera capabilities in these configurations, the beamforming coefficients for the microphone array may be pre-determined and implemented, including based on values that are identified during calibration by a manufacturer. Additionally, camera image handling may be calibrated or adjusted as the device is configured into specific angles or random arrangements.

The available types of intermediate random positions may include many other angles beyond those depicted in FIGS. 8A to 8E. Other random intermediate orientations, not illustrated, may invoke the use of advanced methods for beamforming with deformable or sparse microphone arrays, to determine coefficients in real time for the intermediate microphone array shape. In further examples, advanced methods for beamforming of audio capture may also be used to improve the quality of audio when the device is placed into an intermediate fixed position shapes (with use of reduced or no calibration).

Additional video processing techniques may be used to process video from a camera array of the convertible computing device, for a variety of camera array arrangements and positions. For instance, camera streams can be stitched together using methods of dynamic real-time video stream stitching. Scene-based and object-based identification and stitching can also be performed to assist the quality and perspective of video captured from among differently positioned device segments.

FIGS. 9A to 9E illustrate video rendering scenarios provided in connection with respective uses of a convertible computing device. Each of these scenarios depict separately captured video segments of a user's head and objects in a room. However, it will be understood that other depictions of the users, including wide-angle video of multiple users and the user's bodies or environment, may also be provided.

Figure 9A:
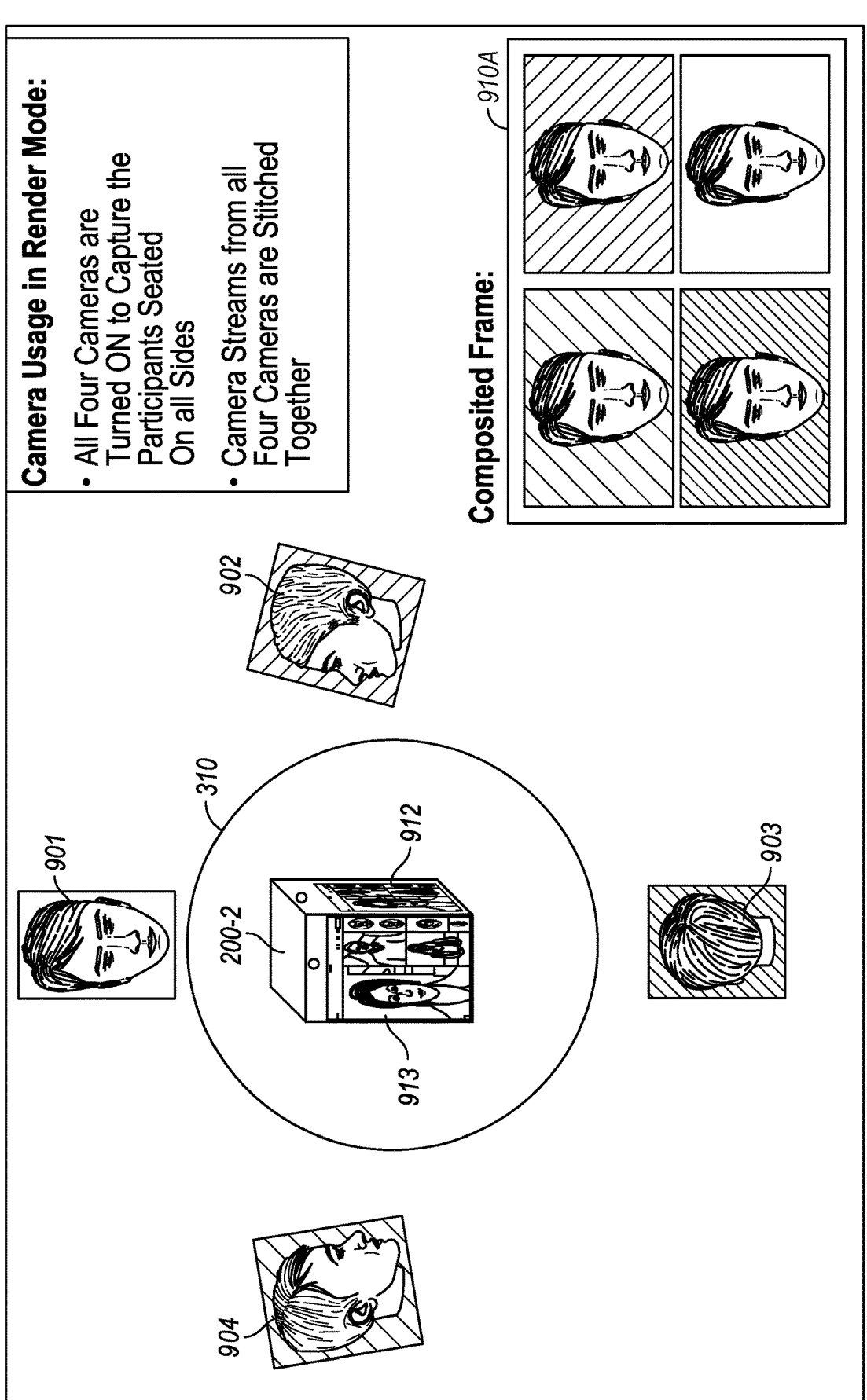

FIG. 9A illustrates a frame composition with four camera streams stitched together with video of all the participants. In this scenario, the cuboid-shaped device 200-2 is again located at the center of the table 310 and is surrounded by four users 901, 902, 903, 904. The display output of the convertible computing device includes a presentation of video on display segment 912 to user 902, a presentation of video on display segment 913 to user 903, and the like. The camera usage in this render mode enables all cameras to be activated and turned on to capture video of the respective users 901, 902, 903, 904. The camera streams from the four cameras are then stitched together (composited) into a video frame 910A. The streams of the respective cameras may be arranged in the video frame 910A based on the position of the user relative to the device or some other criterion.

Figure 9B:
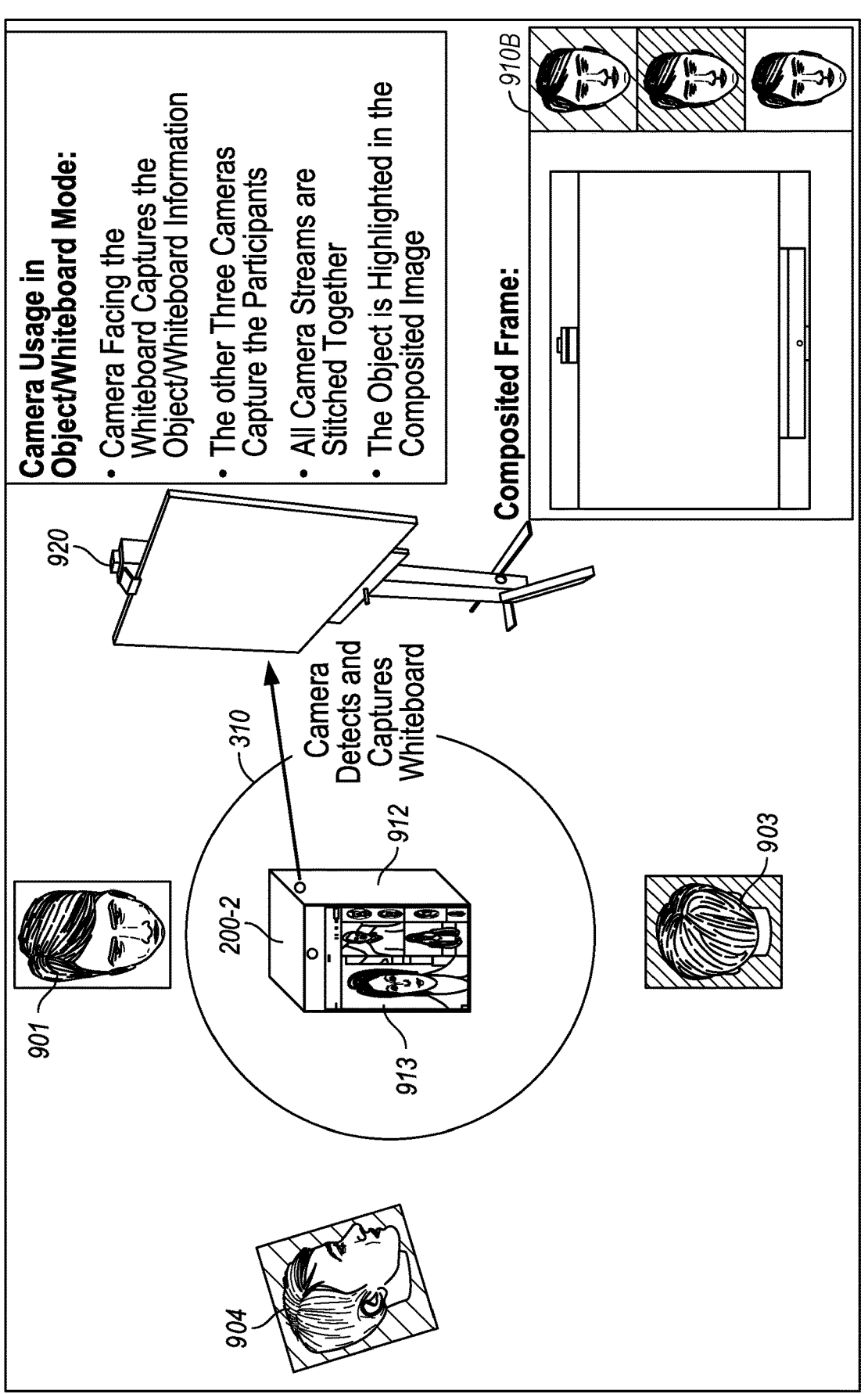

FIG. 9B illustrates a frame composition with four camera streams stitched together, with video of the participants combined with video of one or more real-world objects such as a whiteboard 920. In this example, the object presentation mode is entered based on the camera on display segment 912 detecting the whiteboard 920. The resulting camera streams from the four cameras are then stitched together (composited) into a video frame 910B, having an increased size for the captured whiteboard video.

FIG. 9C illustrates a frame composition with two camera streams stitched together, with video of the two remaining participants (user 901 and user 903) expanded in video frame 910C. In this example, the other two cameras are put in a low capture rate, such as a mode that captures video at reduced frames per second (FPS) rate. Camera streams may be placed into a low FPS mode if a user is not present in a particular camera field of view, or if a user in the field of view provides a command to switch the camera off (e.g., via a button or via a gesture).

Figure 9D:
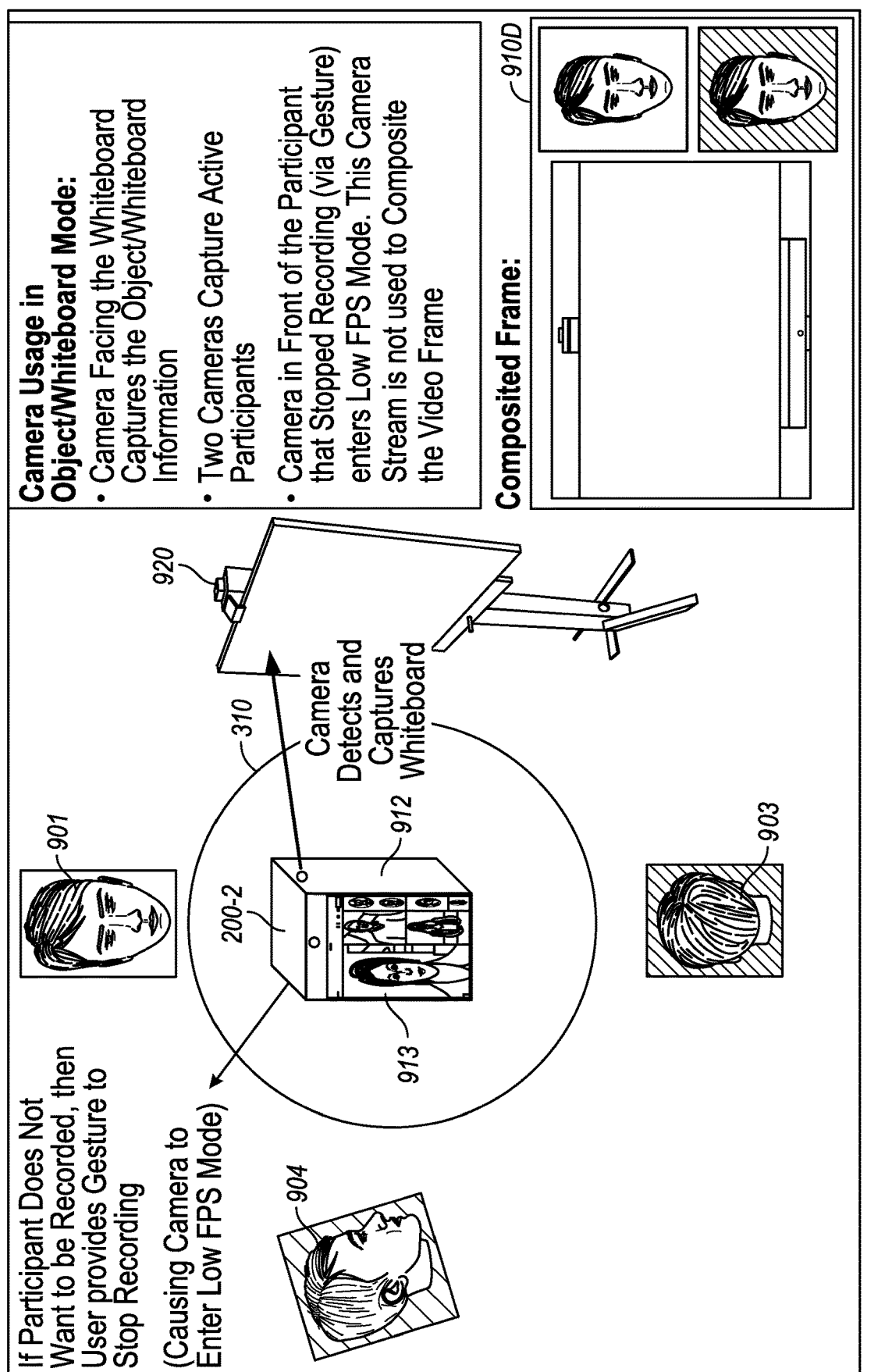

FIG. 9D illustrates a frame composition with three camera streams stitched together, with video of only two of the three participants (user 901, user 903, user 904) expanded in video frame 910D. In this example, one camera is put in low FPS mode (only for detection) or is switched off after an indication by the participant. However, the device has entered the object presentation mode (the object/whiteboard mode) based on the detection of the whiteboard 920. Thus, additional camera streams or content may be highlighted to increase the display of a particular user or objects in the field of view.

Figure 9E:
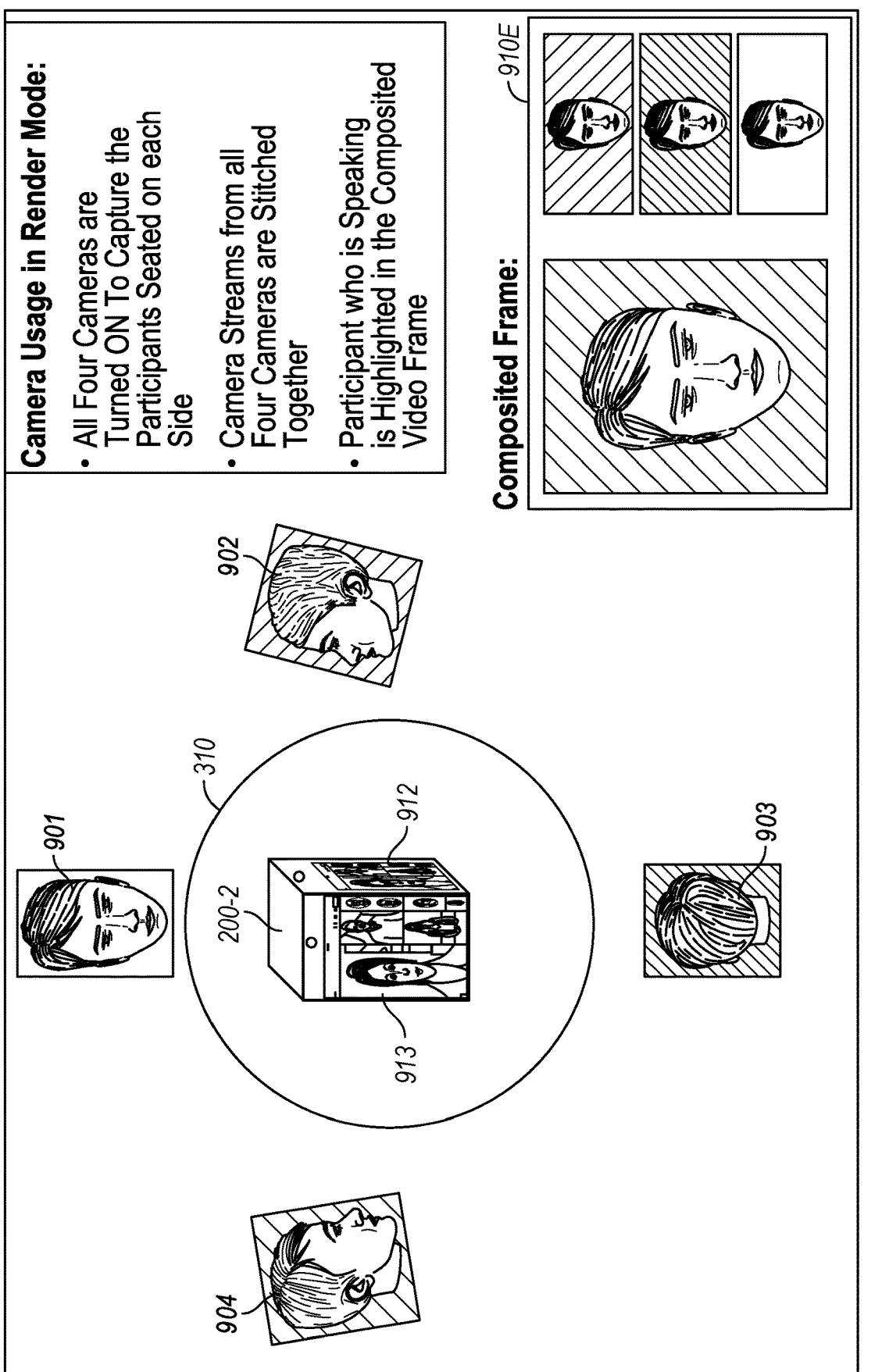

FIG. 9E illustrates a frame composition with four camera streams stitched together, with video of all four participants (user 901, user 902, user 903, user 904) provided in video frame 910E. In this example, the person of interest (the speaker) is highlighted and the video of this user is expanded in the video frame 910E. Consistent with the examples above, highlighted content may include meeting presenters or whiteboards. Meeting presenters or the person of interest may be identified and expanded in the video frame based on their speech or actions.

As an alternative to the camera stream stitching approaches discussed above, each camera stream may be processed separately with clear boundaries between each view. It will be understood that other variations to video processing may occur based on the usage mode of the device.

Figure 10:
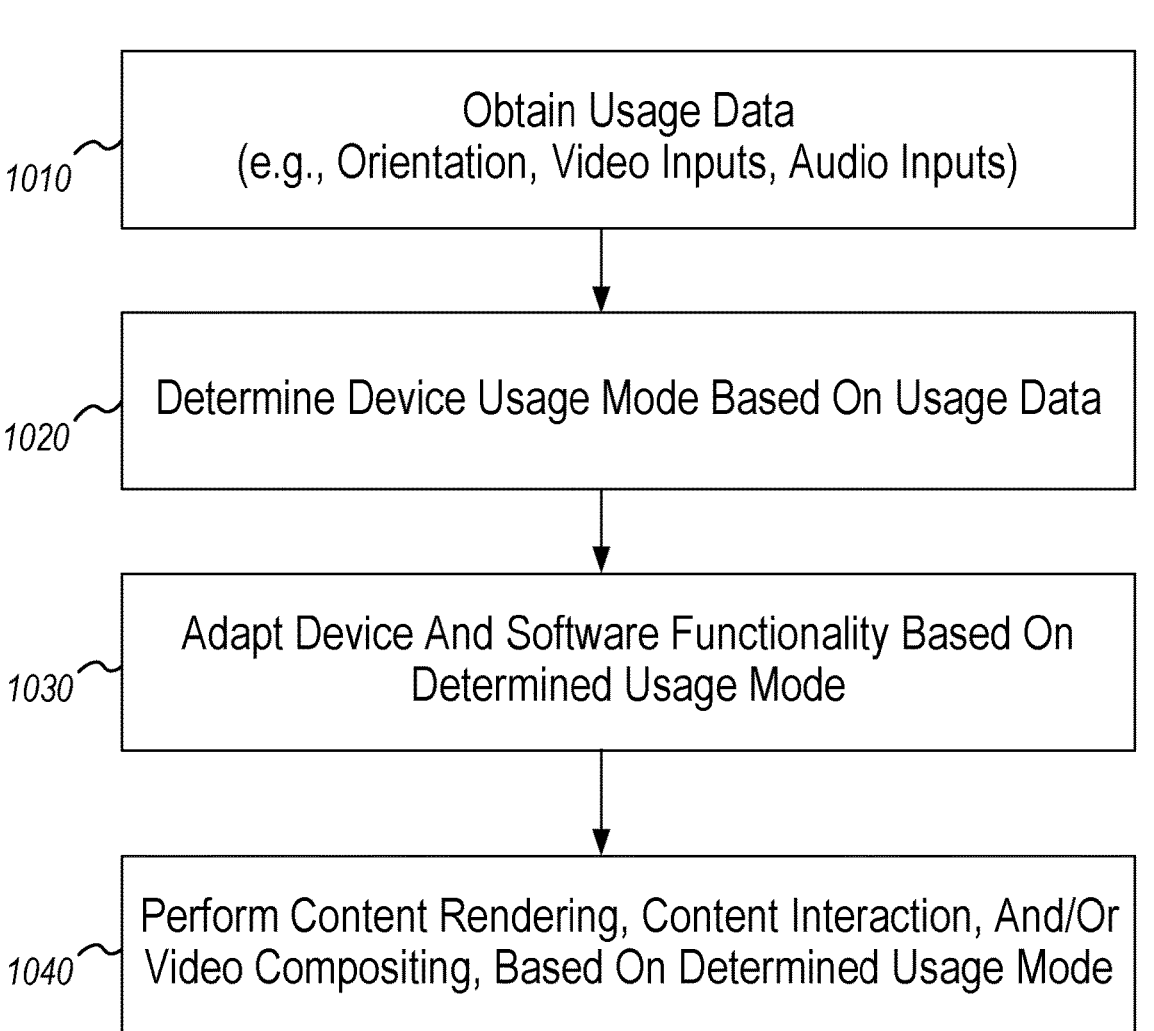
FIG. 10 illustrates a flowchart of an example method for operating a convertible computing device, according to an example.

FIG. 10 illustrates a flowchart of a method for operating a conferencing device. The method may implement the scenarios discussed with reference to FIG. 3A to 9E, discussed above, or a variation of such scenarios. In an example, the method may be implemented in a computing system including a memory device (e.g., storage memory such as non-volatile memory, or in volatile memory) that stores processing instructions and data, and processing circuitry (e.g., at least one processor) that executes processing instructions. In another example, the method may be implemented by at least one non-transitory machine-readable medium capable of storing instructions, where the instructions when executed by at least one processor cause the at least one processor to perform the method.

Operation 1010 of the flowchart 1000 includes obtaining usage data of the convertible computing device (e.g., orientation data, video inputs, audio inputs). Operation 1020 of the flowchart 1000 includes determining a device usage mode based on the sensor data. In an example, the device usage mode is detected based on the positions of the plurality of segments of the computing device, changed between a first, personal computing orientation and a second, multi-user orientation. In an example, the multi-user orientation separates the plurality of segments into respective display areas on outward-facing sides of the display screen, with two of the plurality of segments including a magnetic strip to engage with each other and maintain the computing device in a polyhedron shape in the multi-user orientation; whereas, the personal computing orientation combines the plurality of segments into a substantially flat shape (e.g., substantially level to one another) that provides a contiguous screen area.

Operation 1030 of the flowchart 1000 includes adapting the device and software functionality based on the determined usage mode. The adaptation of the device and software functionality may include controlling audio capture from a microphone array of the computing device, based on the detected usage mode, using a microphone array provided from multiple microphones located among the plurality of segments. The adaptation of the device and software functionality may include controlling video capture from a camera array of the computing device, based on the detected usage mode, using a camera array provided from multiple cameras located among the plurality of segments.

Operation 1040 of the flowchart 1000 includes performing operations based on the determined usage mode, such as content rendering, content interaction, and/or video compositing. This may include controlling display output provided on the display screen (e.g., when segmented or separated into the plurality of segments). The display output may include outputting content from a communication session on the display screen based on the usage mode, such as where content from the communication session comprises composited video from a video call or video conference.

In specific examples, modifying the audio capture includes controlling beamforming of the audio capture from the multiple microphones, based on a relative arrangement of the multiple microphones in the multi-user orientation. As discussed above, the beamforming of the audio capture may be based on coefficients that are determined from calibration. Similarly, modifying the video capture includes compositing at least a portion of the video capture from the multiple cameras, based on a relative arrangement of the multiple cameras in the multi-user orientation.

As noted in FIGS. 3A to 3C, the usage mode may correspond to a content render mode, such that the respective screen segments are configured to render content from the communication session that is customized to the respective users, and where the content render mode includes de-activation of an unused respective screen segment. As noted in FIG. 4, the usage mode may correspond to an interactive mode, such that computing functions are provided on at least one of the respective screen segments based on a position of a respective user relative to the computing device. As noted in FIG. 5, the usage mode may correspond to an object presentation mode, such that video of a real-world object is captured from at least one outward-facing camera of the multiple cameras (e.g., that are located on an outward-facing side of the computing device) and provided in the communication session based on detection of the real-world object.

Figure 11:
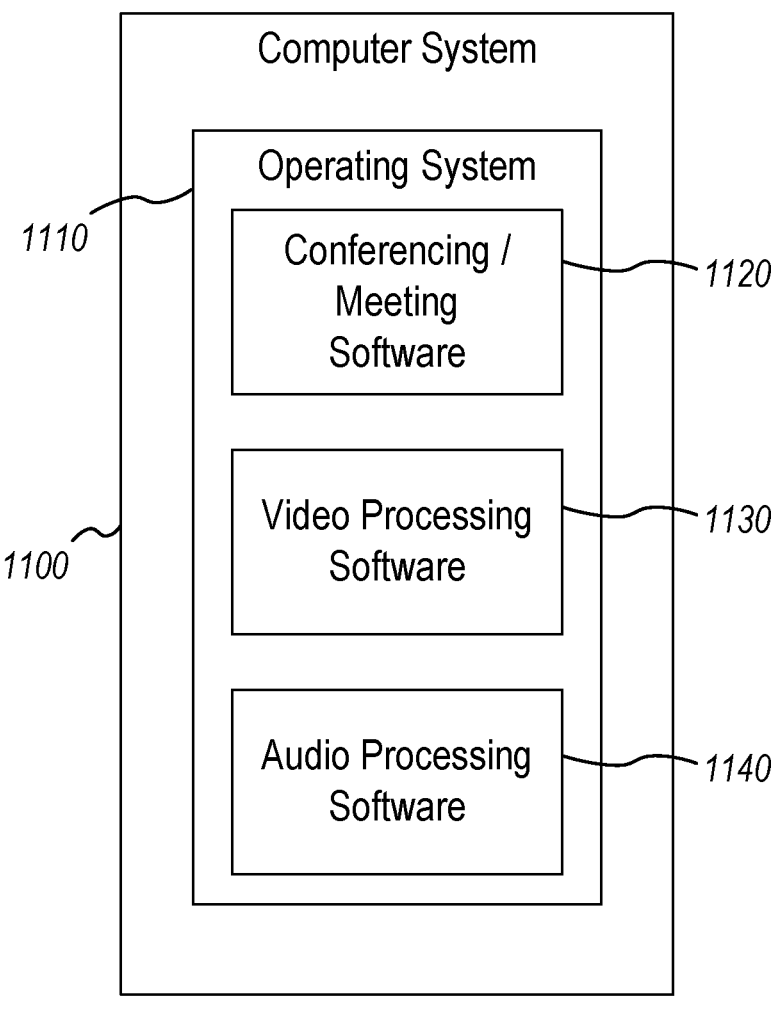
FIG. 11 is a block diagram illustrating a configuration of a computing system to operate video conferencing software, according to an example.

FIG. 11 is a block diagram illustrating a configuration of a computing system 1100. As shown, the computing system 1100 may include an operating system 1110, conferencing or meeting software 1120, video processing software 1130, and audio processing software 1140. For instance, the conferencing and meeting software 1120 may implement aspects of the various usage modes (content render mode, interactive mode, object presentation mode) to change the display views for a respective side of the computing device when in a multi-user orientation. The video processing software 1130 and audio processing software 1140 may also implement functions that enable or detect the respective usage modes. For instance, usage mode may be detected based on some combination of the proximity of a respective user to the computing device; interaction of a respective user with the computing device; analysis of video from the video capture; or analysis of audio from the audio capture. Other computing functions of FIG. 6 may be directly implemented by the operating system 1110 or the software 1120, 1130, 1140.

Embodiments to implement the approaches above may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media (e.g., represented in portions of computer system 1200 in FIG. 12, discussed below).

A processor subsystem (e.g., processor 1202 in FIG. 12, discussed below) may be used to execute the instruction on the computer-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, a hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware implementations, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in the present disclosure, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in the present disclosure, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 12:
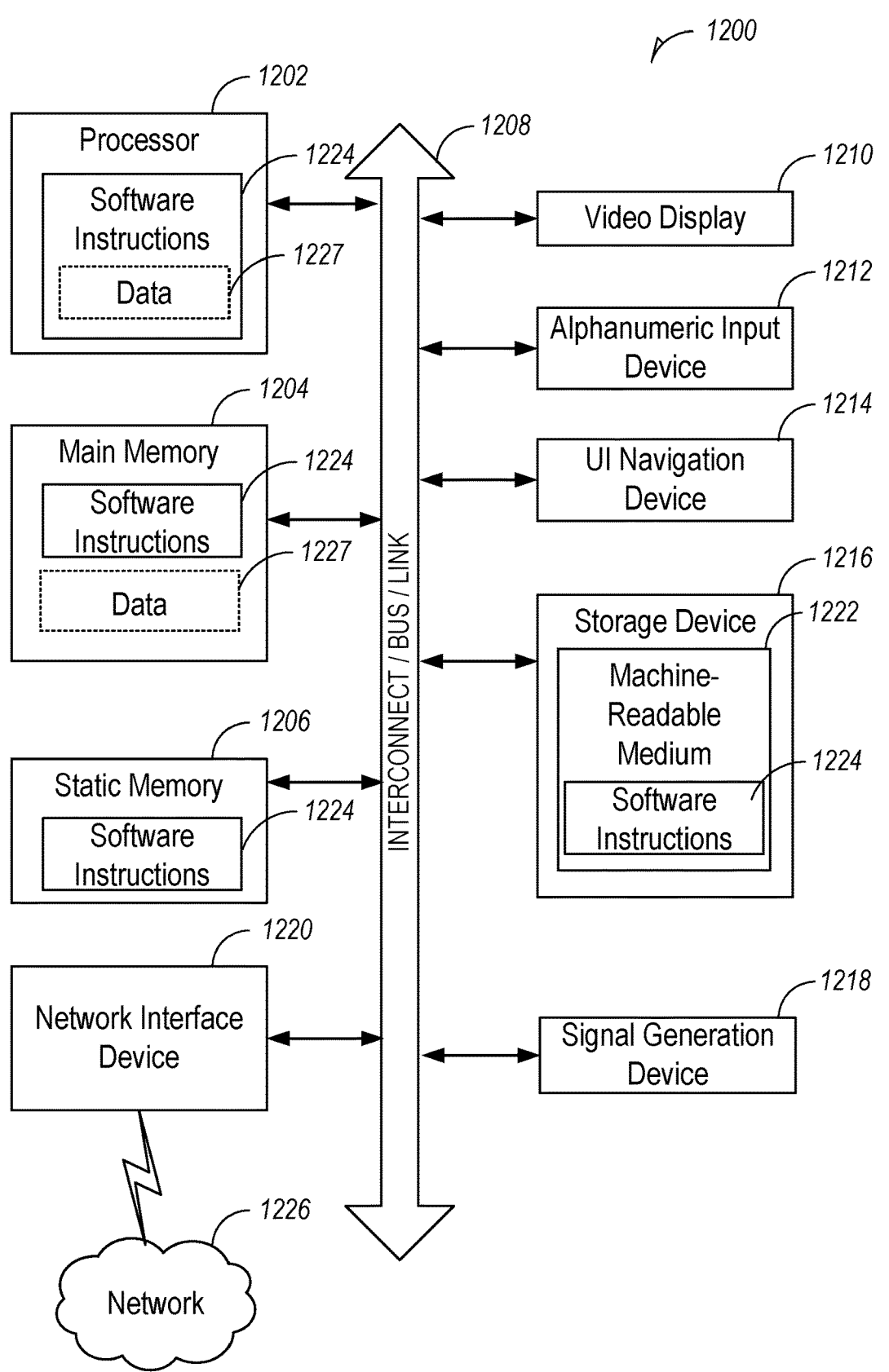
FIG. 12 is a block diagram illustrating an example machine upon which any one or more of the techniques (e.g., methodologies) discussed herein may perform, according to an example.

FIG. 12 is a block diagram illustrating a machine in the example form of a computer system 1200, within which a set or sequence of instructions may be executed to cause the machine to perform any one of the methodologies discussed herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a smartphone or other mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., interconnect or bus). The computer system 1200 may further include a video display unit 1210, an alphanumeric input device 1212 (e.g., a keyboard), and a user interface (UI) navigation device 1214 (e.g., a mouse). In one aspect, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, gyrometer, magnetometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media. As an example, the software instructions 1224 may include instructions to implement and execute the video and audio processing operations via the processor (e.g., with software as configured and operated in the examples of FIG. 3A to FIG. 10). As a further example, the main memory 1204 (or the other memory or storage) may host various data 1227 used with the video and audio processing and interactive conferencing operations discussed herein.

While the machine-readable medium 1222 is illustrated in an example aspect to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, 6G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 is a computing device having a plurality of segments, comprising: a segmented display screen to output a display on the plurality of segments, the plurality of segments capable of being connected and repositioned (e.g., with hinges) between a first orientation (e.g., personal computing orientation) and a second orientation for multiple users (e.g., multi-user orientation); a microphone array comprising multiple microphones located among the plurality of segments for audio capture, and a camera array comprising multiple cameras located among the plurality of segments for video capture; and processing circuitry configured to: detect a usage mode based on an orientation of the plurality of segments, and modify the audio capture and the video capture based on the usage mode; wherein the multi-user orientation separates the plurality of segments into respective display areas on outward-facing sides of the display screen, with two of the plurality of segments including a magnetic strip to engage with each other and maintain the computing device in a polyhedron shape in the multi-user orientation.

In Example 2, the subject matter of Example 1 optionally includes subject matter where the personal computing orientation combines the plurality of segments to be substantially level to one another (e.g., a substantially flat shape) to provide a contiguous screen area.

In Example 3, the subject matter of any one or more of Examples 1-2 optionally include subject matter where to modify the audio capture includes to control beamforming of the audio capture from the multiple microphones, based on a relative arrangement of the multiple microphones in the second orientation, and wherein the beamforming of the audio capture is based on coefficients that are determined from calibration.

In Example 4, the subject matter of any one or more of Examples 1-3 optionally include subject matter where to modify the video capture includes to composite at least a portion of the video capture from the multiple cameras, based on a relative arrangement of the multiple cameras in the second orientation.

In Example 5, the subject matter of any one or more of Examples 1-4 optionally include subject matter where the processing circuitry is further configured to output content from a communication session on the display screen based on the usage mode, and wherein the content from the communication session comprises composited video from a video call or video conference.

In Example 6, the subject matter of Example 5 optionally includes subject matter where respective portions of the display screen corresponding to the plurality of segments are configured to display the content from the communication session to respective users, and wherein each of the respective portions of the display screen are configured to receive user interaction from the respective users for control of the communication session.

In Example 7, the subject matter of Example 6 optionally includes subject matter where the usage mode corresponds to a content render mode, and wherein the respective portions of the display screen are configured to render content from the communication session that is customized to the respective users facing the corresponding portion of the display screen, and wherein the content render mode includes de-activation of an unused portion of the display screen.

In Example 8, the subject matter of any one or more of Examples 6-7 optionally include subject matter where the usage mode corresponds to an interactive mode, and wherein computing functions are provided on at least one of the respective portions of the display screen based on a position of a respective user relative to the computing device.

In Example 9, the subject matter of any one or more of Examples 6-8 optionally include subject matter where the usage mode corresponds to an object presentation mode, and wherein video of a real-world object is captured from at least one of the multiple cameras that are outward-facing and provided in the communication session based on detection of the real-world object.

In Example 10, the subject matter of any one or more of Examples 1-9 optionally include subject matter where the usage mode is further detected based on a combination of one or more of: proximity of a first respective user to the computing device; interaction of a second respective user with the computing device; analysis of video from the video capture; or analysis of audio from the audio capture.

Example 11 is at least one non-transitory machine-readable medium capable of storing instructions, wherein the instructions when executed by at least one processor of a computing device, cause the at least one processor to: detect a usage mode of the computing device, based on positioning of a plurality of segments of the computing device between a first orientation (e.g., personal computing orientation) and a second orientation (e.g., multi-user orientation); control audio capture from a microphone array of the computing device, wherein the audio capture is controlled based on the detected usage mode, and wherein the microphone array includes multiple microphones located among the plurality of segments; control video capture from a camera array of the computing device, wherein the video capture is controlled based on the detected usage mode, and wherein the camera array includes multiple cameras located among the plurality of segments; and control display output on a display screen segmented into the plurality of segments; wherein the second orientation separates the plurality of segments into respective display areas on outward-facing sides of the display screen, with two of the plurality of segments including a magnetic strip to engage with each other and maintain the computing device in a polyhedron shape in the second orientation.

In Example 12, the subject matter of Example 11 optionally includes subject matter where the first orientation combines the plurality of segments to be substantially level to one another (e.g., into a substantially flat shape) to provide a contiguous screen area.

In Example 13, the subject matter of any one or more of Examples 11-12 optionally include subject matter where to modify the audio capture includes to control beamforming of the audio capture from the multiple microphones, based on a relative arrangement of the multiple microphones in the second orientation, and wherein the beamforming of the audio capture is based on coefficients that are determined from calibration.

In Example 14, the subject matter of any one or more of Examples 11-13 optionally include subject matter where to modify the video capture includes to composite at least a portion of the video capture from the multiple cameras, based on a relative arrangement of the multiple cameras in the second orientation.

In Example 15, the subject matter of any one or more of Examples 11-14 optionally include subject matter where the instructions further cause the at least one processor to output content from a communication session on the display screen based on the usage mode, and wherein the content from the communication session comprises composited video from a video call or video conference.

In Example 16, the subject matter of Example 15 optionally includes subject matter where respective portions of the display screen corresponding to the plurality of segments are configured to display the content from the communication session to respective users, and wherein each of the respective portions of the display screen are configured to receive user interaction from the respective users for control of the communication session.

In Example 17, the subject matter of Example 16 optionally includes subject matter where the usage mode corresponds to a content render mode, and wherein the respective portions of the display screen are configured to render content from the communication session that is customized to the respective users facing the corresponding portion of the display screen, and wherein the content render mode includes de-activation of an unused portions of the display screen.

In Example 18, the subject matter of any one or more of Examples 16-17 optionally include subject matter where the usage mode corresponds to an interactive mode, and wherein computing functions are provided on at least one of the respective portions of the display screen based on a position of a respective user relative to the computing device.

In Example 19, the subject matter of any one or more of Examples 16-18 optionally include subject matter where the usage mode corresponds to an object presentation mode, and wherein video of a real-world object is captured from at least one of the multiple cameras that are outward-facing and provided in the communication session based on detection of the real-world object.

In Example 20, the subject matter of any one or more of Examples 11-19 optionally include subject matter where the usage mode is further detected based on a combination of one or more of: proximity of a first respective user to the computing device; interaction of a second respective user with the computing device; analysis of video from the video capture; or analysis of audio from the audio capture.

Example 21 is a method for adapting a convertible computing device having a plurality of segments, comprising: detecting a usage mode of the computing device, based on positions of the plurality of segments of the computing device between a first orientation (e.g., personal computing orientation) and a second orientation (e.g., multi-user orientation); controlling audio capture from a microphone array of the computing device, wherein the audio capture is controlled based on the detected usage mode, and wherein the microphone array includes multiple microphones located among the plurality of segments; controlling video capture from a camera array of the computing device, wherein the video capture is controlled based on the detected usage mode, and wherein the camera array includes multiple cameras located among the plurality of segments; controlling display output on a display screen segmented into the plurality of segments; wherein the second orientation separates the plurality of segments into respective display areas on outward-facing sides of the display screen, with two of the plurality of segments including a magnetic strip to engage with each other and maintain the computing device in a polyhedron shape in the second orientation.

In Example 22, the subject matter of Example 21 optionally includes subject matter where the first orientation combines the plurality of segments to be substantially level to one another (e.g., into a substantially flat shape) to provide a contiguous screen area.

In Example 23, the subject matter of any one or more of Examples 21-22 optionally include subject matter where modifying the audio capture includes controlling beamforming of the audio capture from the multiple microphones, based on a relative arrangement of the multiple microphones in the second orientation, and wherein the beamforming of the audio capture is based on coefficients that are determined from calibration.

In Example 24, the subject matter of any one or more of Examples 21-23 optionally include subject matter where modifying the video capture includes compositing at least a portion of the video capture from the multiple cameras, based on a relative arrangement of the multiple cameras in the second orientation.

In Example 25, the subject matter of any one or more of Examples 21-24 optionally include outputting content from a communication session on the display screen based on the usage mode, and wherein the content from the communication session comprises composited video from a video call or video conference.

In Example 26, the subject matter of Example 25 optionally includes subject matter where respective portions of the display screen corresponding to the plurality of segments are configured to display the content from the communication session to respective users, and wherein each of the respective portions of the display screen are configured to receive user interaction from the respective users for control of the communication session.

In Example 27, the subject matter of Example 26 optionally includes subject matter where the usage mode corresponds to a content render mode, and wherein the respective portions of the display screen are configured to render content from the communication session that is customized to the respective users, and wherein the content render mode includes de-activation of an unused respective portion of the display screen.

In Example 28, the subject matter of any one or more of Examples 26-27 optionally include subject matter where the usage mode corresponds to an interactive mode, and wherein computing functions are provided on at least one of the respective portions of the display screen based on a position of a respective user relative to the computing device.

In Example 29, the subject matter of any one or more of Examples 26-28 optionally include subject matter where the usage mode corresponds to an object presentation mode, and wherein video of a real-world object is captured from at least one of the multiple cameras that are outward-facing and provided in the communication session based on detection of the real-world object.

In Example 30, the subject matter of any one or more of Examples 21-29 optionally include subject matter where the usage mode is further detected based on a combination of one or more of: proximity of a first respective user to the computing device; interaction of a second respective user with the computing device; analysis of video from the video capture; or analysis of audio from the audio capture.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate aspect. The scope of the embodiments disclosed herein is to be determined with reference to the appended claims, along with the full scope of equivalents to which such claims are entitled.

What is claimed is:

1. A computing device having a plurality of segments, comprising:

a segmented display screen to output a display on the plurality of segments, the plurality of segments capable of being connected and repositioned between a first orientation and a second orientation for multiple users;

a microphone array comprising multiple microphones located among the plurality of segments for audio capture, and a camera array comprising multiple cameras located among the plurality of segments for video capture; and processing circuitry configured to: detect a usage mode based on an orientation of the plurality of segments, and modify the audio capture and the video capture based on the usage mode;

wherein the second orientation separates the plurality of segments into respective display areas on outward-facing sides of the display screen, with two of the plurality of segments including a magnetic strip to engage with each other and maintain the computing device in a polyhedron shape in the second orientation.

2. The computing device of claim 1, wherein the first orientation combines the plurality of segments to be substantially level to one another to provide a contiguous screen area.

3. The computing device of claim 1, wherein to modify the audio capture includes to control beamforming of the audio capture from the multiple microphones, based on a relative arrangement of the multiple microphones in the second orientation, and wherein the beamforming of the audio capture is based on coefficients that are determined from calibration.

4. The computing device of claim 1, wherein to modify the video capture includes to composite at least a portion of the video capture from the multiple cameras, based on a relative arrangement of the multiple cameras in the second orientation.

5. The computing device of claim 1, wherein the processing circuitry is further configured to output content from a communication session on the display screen based on the usage mode, and wherein the content from the communication session comprises composited video from a video call or video conference.

6. The computing device of claim 5, wherein respective portions of the display screen corresponding to the plurality of segments are configured to display the content from the communication session to respective users, and wherein each of the respective portions of the display screen are configured to receive user interaction from the respective users for control of the communication session.

7. The computing device of claim 6, wherein the usage mode corresponds to a content render mode, and wherein the respective portions of the display screen are configured to render content from the communication session that is customized to the respective users facing the corresponding portion of the display screen, and wherein the content render mode includes de-activation of an unused portion of the display screen.

8. The computing device of claim 6, wherein the usage mode corresponds to an interactive mode, and wherein computing functions are provided on at least one of the respective portions of the display screen based on a position of a respective user relative to the computing device.

9. The computing device of claim 6, wherein the usage mode corresponds to an object presentation mode, and wherein video of a real-world object is captured from at least one of the multiple cameras that are outward-facing and provided in the communication session based on detection of the real-world object.

10. The computing device of claim 1, wherein the usage mode is further detected based on a combination of one or more of:

proximity of a first respective user to the computing device;

interaction of a second respective user with the computing device;

analysis of video from the video capture; or analysis of audio from the audio capture.

11. At least one non-transitory machine-readable medium capable of storing instructions, wherein the instructions when executed by at least one processor of a computing device, cause the at least one processor to:

20 detect a usage mode of the computing device, based on positioning of a plurality of segments of the computing device between a first orientation and a second orientation for multiple users;

control audio capture from a microphone array of the computing device, wherein the audio capture is controlled based on the detected usage mode, and wherein the microphone array includes multiple microphones located among the plurality of segments;

control video capture from a camera array of the computing device, wherein the video capture is controlled based on the detected usage mode, and wherein the camera array includes multiple cameras located among the plurality of segments; and control display output on a display screen segmented into the plurality of segments;

wherein the second orientation separates the plurality of segments into respective display areas on outward-facing sides of the display screen, with two of the plurality of segments including a magnetic strip to engage with each other and maintain the computing device in a polyhedron shape in the second orientation.

12. The at least one non-transitory machine-readable medium of claim 11, wherein the first orientation combines the plurality of segments to be substantially level to one another to provide a contiguous screen area.

13. The at least one non-transitory machine-readable medium of claim 11, wherein to modify the audio capture includes to control beamforming of the audio capture from the multiple microphones, based on a relative arrangement of the multiple microphones in the second orientation, and wherein the beamforming of the audio capture is based on coefficients that are determined from calibration.

14. The at least one non-transitory machine-readable medium of claim 11, wherein to modify the video capture includes to composite at least a portion of the video capture from the multiple cameras, based on a relative arrangement of the multiple cameras in the second orientation.

15. The at least one non-transitory machine-readable medium of claim 11, wherein the instructions further cause the at least one processor to output content from a communication session on the display screen based on the usage mode, and wherein the content from the communication session comprises composited video from a video call or video conference.

16. The at least one non-transitory machine-readable medium of claim 15, wherein respective screen segments of the plurality of segments are configured to display the content from the communication session to respective users, and wherein each of the respective screen segments are configured to receive user interaction from the respective users for control of the communication session.

17. The at least one non-transitory machine-readable medium of claim 16, wherein the usage mode corresponds to a content render mode, and wherein the respective screen segments are configured to render content from the communication session that is customized to the respective users, and wherein the content render mode includes de-activation of an unused respective screen segment.

18. The at least one non-transitory machine-readable medium of claim 16, wherein the usage mode corresponds to an interactive mode, and wherein computing functions are provided on at least one of the respective screen segments based on a position of a respective user relative to the computing device.

19. The at least one non-transitory machine-readable medium of claim 16, wherein the usage mode corresponds to an object presentation mode, and wherein video of a real-world object is captured from at least one of the multiple cameras that are outward-facing and provided in the communication session based on detection of the real-world object.

20. The at least one non-transitory machine-readable medium of claim 11, wherein the usage mode is further detected based on a combination of one or more of:

proximity of a first respective user to the computing device;

interaction of a second respective user with the computing device;

analysis of video from the video capture; or analysis of audio from the audio capture.

\* \* \* \* \*